US008787484B2

(12) United States Patent
Liu

(10) Patent No.: US 8,787,484 B2
(45) Date of Patent: Jul. 22, 2014

(54) PRECODING TECHNIQUES FOR DOWNLINK COORDINATED MULTIPOINT TRANSMISSION IN RADIO COMMUNICATIONS SYSTEM

(75) Inventor: Le Liu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/704,802

(22) PCT Filed: Jun. 18, 2010

(86) PCT No.: PCT/JP2010/004078
§ 371 (c)(1),
(2), (4) Date: Dec. 17, 2012

(87) PCT Pub. No.: WO2011/158302
PCT Pub. Date: Dec. 22, 2011

(65) Prior Publication Data
US 2013/0089159 A1  Apr. 11, 2013

(51) Int. Cl.
 H04B 7/02 (2006.01)
 H04L 1/02 (2006.01)
 H04B 7/04 (2006.01)
 H04B 7/06 (2006.01)

(52) U.S. Cl.
 CPC ............. *H04B 7/024* (2013.01); *H04B 7/0417* (2013.01); *H04B 7/0617* (2013.01); *H04B 7/0632* (2013.01); *H04B 7/0634* (2013.01); *H04B 7/0452* (2013.01); *H04B 7/063* (2013.01); *H04B 7/0626* (2013.01); *H04B 7/026* (2013.01)
 USPC ............................ 375/267; 375/260; 375/259

(58) Field of Classification Search
 USPC ........................................................ 375/267
 See application file for complete search history.

(56) References Cited

U.S. PATENT DOCUMENTS

| 2010/0091742 | A1* | 4/2010 | Lee et al. ....................... 370/336 |
| 2011/0237282 | A1* | 9/2011 | Geirhofer et al. .............. 455/509 |
| 2011/0292847 | A1* | 12/2011 | Yoon et al. ..................... 370/280 |
| 2012/0230274 | A1* | 9/2012 | Xiao et al. ..................... 370/329 |
| 2013/0017833 | A1* | 1/2013 | Sakamoto et al. ............. 455/436 |
| 2013/0044602 | A1* | 2/2013 | Xiao et al. ..................... 370/237 |
| 2013/0279403 | A1* | 10/2013 | Takaoka et al. ................ 370/328 |

FOREIGN PATENT DOCUMENTS

| JP | 2009-010752 A | 1/2009 |
| JP | 2010-045783 A | 2/2010 |
| WO | 2009-084905 A2 | 7/2009 |
| WO | 2011/036937 A1 | 3/2011 |

OTHER PUBLICATIONS

3GPP TSG RAN WG1 Meeting #57bis, "UE feedback for downlink CoMP", ETRI, Jun. 29-Jul. 3, 2009, R1-092304, pp. 1-6.
3GPP TSG RAN WG1 Meeting #57bis,"Comparison of CSI Feedback Schemes", Alcatel-Lucent, Jun. 29-Jul. 3, 2009, R1-092310, pp. 1-11.

(Continued)

*Primary Examiner* — Erin File
(74) *Attorney, Agent, or Firm* — Sughrue Mion, PLLC

(57) ABSTRACT

A precoding vector of coordinated multipoint transmission (CoMP) for at least one user equipment is decided by receiving the channel state information for CoMP from the user equipment, wherein the channel state information includes inter-cell correlation property between a serving cell serving the user equipment and a cooperating cell for CoMP; and deciding the precoding vector of CoMP based on the channel state information.

19 Claims, 15 Drawing Sheets

(56) References Cited

OTHER PUBLICATIONS

3GPP TR 36.814, V9.0.0, "3rd Generation Partnership Project; Technical Specification Group Radio Access Network; Evolved Universal Terrestrial Radio Access(E-UTRA); Further advancements for E-UTRA physical layer aspects", Release 9, Mar. 2010, pp. 1-104.

3GPP TR 36.913, V9.0.0, "3rd Generation Partnership Project; Technical Specification Group Radio Access Network; Requirements for further advancements for Evolved Universal Terrestrial Radio Access (E-UTRA)(LTE-Advanced)", Release 9, Dec. 2010, pp. 1-15.

3GPP TR 36.814, V2.0.0, "3rd Generation Partnership Project; Technical Specification Group Radio Access Network; Further advancements for E-UTRA Physical Layer Aspects", Release 9, Mar. 2010, pp. 1-67.

3GPP TSG RAN WG1 #60, "Feedback of Long Term Channel Information for Adaptive Codebook", Huawei, Feb. 2010, R1-101062, pp. 1-5.

3GPP TSG RAN WG1 #60, "PMI-based Multi-Granular Feedback for SU/MU-MIMO Operation", Ericsson, ST-Ericsson, Feb. 22-26, 2010, R1-100852, pp. 1-5.

3GPP TSG RAN WG1 Meeting #58bis, "Views on Scalable CSI Feedback for DL CoMP in LTE-Advanced", NTT DOCOMO, Oct. 12-16, 2009, R1-094243, pp. 1-5.

Communication dated Dec. 11, 2013, issued by the Japanese Patent Office in corresponding Application No. 2013-514844.

* cited by examiner

PRECODING TECHNIQUES FOR DOWNLINK COORDINATED MULTIPOINT TRANSMISSION IN RADIO COMMUNICATIONS SYSTEM

CROSS REFERENCE TO RELATED APPLICATIONS

This application is a National Stage of International Application No. PCT/JP2010/004078 filed Jun. 18, 2010, the contents of all of which are incorporated herein by reference in their entirety.

TECHNICAL FIELD

The present invention relates generally to a radio communications system and, more specifically, to precoding techniques including precoding vector selection and feedback for downlink (DL) coordinated multipoint transmission (COMP).

BACKGROUND ART

MIMO (Multiple Input Multiple Output) technologies have been widely used to improve data transmission rate, cell coverage and average cell throughput. MIMO uses a precoding technique, which adaptively controls a precoding vector based on feedback information received from user terminals (e.g. PTL 1).

Recently, LTE (Long Term Evolution)-Advanced standard is being developed for 4th generation system (4G), where the fairly aggressive target in system performance requirements have been defined, particularly in terms of spectrum efficiency for both downlink (DL) and uplink (UL) as indicated in the Sect. 8 of NPL 1. Considering the target of the cell-edge user throughput and the average cell throughput, which is set to be roughly much higher than that of LTE Release 8 (or Rel8), it seems that the coordinated transmission is necessarily included as a major candidate in LTE-Advanced techniques.

Coordinated multi-point transmission/reception is considered for LTE-Advanced as a tool to improve the coverage of high data rates, the cell-edge throughput and/or to increase system throughput in both high load and low load scenarios as described in the Sect. 8 of NPL 2. The point for coordinated multi-point transmission/reception can be used as a cell, base station, Node-B, eNB, remote radio equipment (RRE), distributed antenna, etc.

According to 3GPP RAN1 study item discussion, the additional feedback scheme for supporting coordinated multi-point transmission (CoMP) is needed and it was agreed that the feedback designed for CoMP should have good backward-compatibility to the feedback for LTE Release 8/9. In addition, the feedback design for CoMP should be consistent with the enhanced feedback framework for supporting single-cell dynamic switch between SU (single user)-MIMO and MU (Multi user)-MIMO transmission in LTE-Advanced as described in Sect. 7.3 of NPL 2.

In LTE Release 8/9, user equipment (UE) measures and feeds back the channel state information (CSI) to its serving cell. The serving cell is defined as a cell to transmit physical downlink control channel (PDCCH) to the UE as defined in Sect. 8.1.1 of NPL 2. The feedback CSI includes the UE recommended precoding matrix index (PMI) of Release-8 codebook, channel quality index (CQI) in terms of signal-to-interference plus noise ratio (SINR), and rank indicator (RI) for optimizing a single-cell SU-MIMO transmission (e.g., throughput maximization). The eNB directly use the feedback PMI/RI to carry out the precoding transmission. The feedback CQI is used for channel-dependent scheduling.

For LTE-Advanced, it is required that the single-cell dynamic SU/MU-MIMO transmission is supported, by which SU-MIMO and MU-MIMO transmission can be dynamically switched e.g., TTI-by-TTI or frame-by-frame, which is hereafter referred to as single-cell SU/MU-MIMO transmission. An enhanced feedback scheme for single-cell dynamic SU/MU-MIMO has been proposed in NPL 3 and NPL 4, where the long-term auto-correlation (or self-correlation) channel matrix of the serving cell is fed back in addition to the short-term CQI/PMI/RI. The long-term (e.g., 50 ms, 100 ms or 1 s) and/or wideband (e.g., full system bandwidth) auto-correlation channel matrix is to capture the semi-static and/or frequency-non-selective correlation characteristics of channel; the short-term (e.g., 1 ms, 5 ms or 10 ms) and/or subband CQI/PMI/RI is used to represent instantaneous and/or frequency-selective channel. Based on the enhanced feedback, the eNB can decide the precoding vector for SU-MIMO and MU-MIMO, respectively. The SU-MIMO and MU-MIMO transmission can be dynamically switched (e.g., TTI-by-TTI) by choosing the higher achievable data rate based on the long-term and short-term feedback.

For LTE-Advanced DL CoMP, NPL 5 discloses a scheme to feed back per-cell long-term and short-term PMI/RI/CQI. It is a simple extension of enhanced feedback for single-cell SU/MU-MIMO transmission. The eNB uses the per-cell feedback CSI to select the precoding vector for each cell. The per-cell long-term feedback includes the respective auto-correlation channel matrixes of the serving cell and neighbor cell (regarded as a cooperating cell for CoMP). The per-cell short-term PMI/RI/CQI feedback is selected in the same way as single-cell transmission at the serving cell and neighbor cell. However, such a precoding vector selection for individual cell is separate precoding and the inter-cell interference is not considered. Therefore, the scheme for DL CoMP feedback as described in NPL 5 can only support separate precoding with SU/MU-MIMO transmission. Similarly, PTL 2 discloses a multi-cell coordinated transmission method which employs the feedback scheme supporting the separate precoding, which is similar to the scheme for DL CoMP feedback of NPL 5 (see PTL 2, paragraph 0106, col. 15).

{NPL 1} 3GPP TR 36.913 v9.0.0, Requirements for further advancements for Evolved Universal Terrestrial Radio Access (E-UTRA) (LTE-Advanced), December 2009. http://www.3gpp.org/ftp/Specs/archive/36_series/36.913/.
{NPL 2} 3GPP TR 36.814 (V2.0.1), "Further Advancements for E-UTRA Physical Layer Aspects," http://www.3gpp.org/ftp/Specs/archive/36_series/36.814/.
{NPL 3} R1-101062, Huawei
{NPL 4} R1-1000852, Ericsson
{NPL 5} R1-094243, NTT DOCOMO
{PTL 1} JP2009-10752A
{PTL 2} JP2010-45783A

SUMMARY

Technical Problem

The above-described scheme gives a simple CoMP feedback extension concept to support CoMP separate precoding with dynamic SU/MU-MIMO. At the eNB side, the scheduler has flexibility to dynamically select the precoding vector for CoMP separate precoding with SU-MIMO or CoMP separate precoding with MU-MIMO. However, the separate precoding does not consider any inter-cell interference. As a result, the performance of CoMP separate precoding is worse than that of CoMP joint precoding.

An object of the present invention is to provide a precoding vector deciding method and system which can achieve CoMP joint precoding allowing improved DL CoMP performance with smaller feedback overhead.

Solution to Problem

According to the present invention, a method for deciding a precoding vector of coordinated multipoint transmission (CoMP) for at least one user equipment in a network, includes the steps of: receiving channel state information for CoMP from the user equipment, wherein the channel state information includes inter-cell correlation property between a serving cell serving the user equipment and a cooperating cell for CoMP; and deciding the precoding vector of CoMP based on the channel state information.

According to the present invention, a system for deciding a precoding vector of coordinated multipoint transmission (CoMP) for at least one user equipment in a network, includes: a receiver for receiving channel state information for CoMP from the user equipment, wherein the channel state information includes inter-cell correlation property between a serving cell serving the user equipment and a cooperating cell for CoMP; and a scheduler for deciding the precoding vector of CoMP based on the channel state information.

Advantageous Effects of Invention

According to the present invention, effective improvement in DL CoMP performance can be achieved with a smaller amount of feedback overhead.

For a more complete understanding of the present disclosure and its advantages, reference is now made to the following description taken in conjunction with the accompanying drawings, in which like reference numerals represent like parts.

BRIEF DESCRIPTION OF DRAWINGS

FIG. 1 is a schematic diagram illustrating CoMP with SU-MIMO transmission in a radio communications system according to an exemplary embodiment of the present invention.
FIG. 2 is a schematic diagram illustrating CoMP JT with MU-MIMO transmission in a radio communications system according to the exemplary embodiment of the present invention.
FIG. 3 is a block diagram illustrating a base station in a radio communications system according to one of the above-mentioned exemplary embodiments of the present invention.
FIG. 4 is a block diagram illustrating a transmitter of the base station as shown in FIG. 3.
FIG. 5 is a block diagram illustrating a user equipment in a radio communications system according to one of the above-mentioned exemplary embodiments of the present invention.
FIG. 6 is a flowchart illustrating a precoding and scheduling process at the base station as shown in FIG. 3.
FIG. 7 is a flowchart illustrating a CSI feedback process at the user equipment as shown in FIG. 5.
FIG. 8 is a schematic diagram illustrating SU-MIMO transmission for explanation of system operation as shown in FIGS. 6 and 7.
FIG. 9 is a schematic diagram illustrating MU-MIMO transmission for explanation of system operation as shown in FIGS. 6 and 7.
FIG. 10 is a schematic diagram illustrating intra-eNB CoMP JT with SU-MIMO transmission for explanation of system operation as shown in FIGS. 6 and 7.
FIG. 11 is a schematic diagram illustrating inter-eNB CoMP JT with SU-MIMO transmission for explanation of system operation as shown in FIGS. 6 and 7.
FIG. 12 is a schematic diagram illustrating intra-eNB CoMP JT with MU-MIMO transmission for explanation of system operation as shown in FIGS. 6 and 7.
FIG. 13 is a schematic diagram illustrating inter-eNB CoMP JT with MU-MIMO transmission for explanation of system operation as shown in FIGS. 6 and 7.
FIG. 14 is a schematic diagram illustrating intra-eNB CoMP CB for explanation of system operation as shown in FIGS. 6 and 7.
FIG. 15 is a schematic diagram illustrating inter-eNB CoMP CB for explanation of system operation as shown in FIGS. 6 and 7.

DETAILED DESCRIPTION OF PREFERRED EMBODIMENTS

Figure 1:
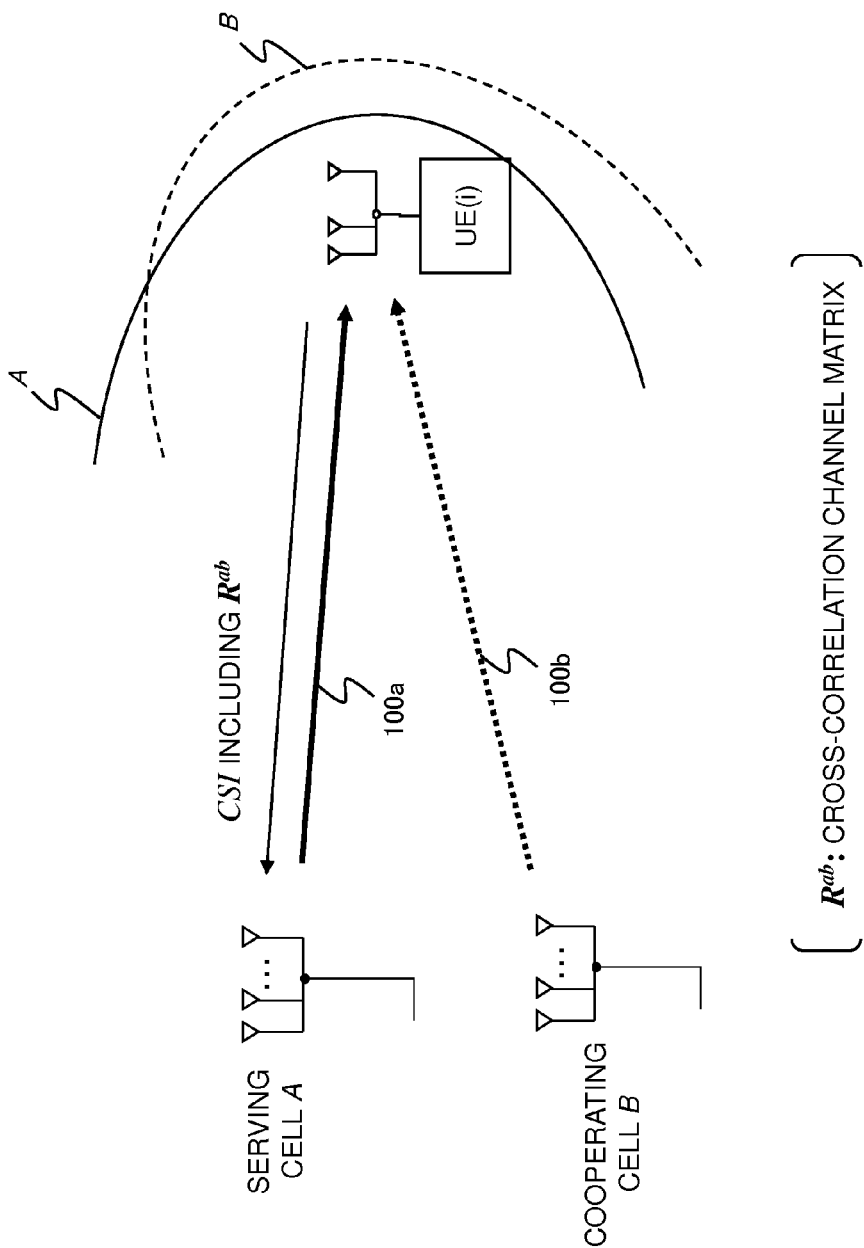
{FIG. 1}

The preferred embodiments of the present invention will be explained by making references to the accompanied drawings. The embodiments used to describe the principles of the present invention are by way of illustration only and should not be construed in any way to limit the scope of the disclosure. Those skilled in the art will understand that the principles of the present disclosure may be implemented in any suitably arranged wireless network.

1. Exemplary embodiments

In radio communications systems according to an exemplary embodiment of the present invention, it is assumed that a data transmitting side selects precoding vector for downlink (DL) coordinated multi-point transmission (CoMP) while dynamically switching between joint transmission (JT) with single-user (SU)-MIMO and JT with multi-user (MU)-MIMO. Coordinated beam-forming (CB), which is a simple example of CoMP JT MU-MIMO, may be added in the dynamic switch operation. For CoMP CB, only the UE's serving cell transmits the data to the UE, minimizing the inter-cell interference from the UE's neighbor cell (or cooperating cell). In contrast, for CoMP JT, both the serving cell and the neighbor cell transmit the data to the UE.

As described later, by using a cross-correlation (or inter-cell correlation) matrix between the target user equipment's (UE's) serving cell and neighbor cell in addition to auto-correlation channel matrixes of the serving cell and the neighbor cell, it is possible to improve the coherent joint transmitted signal and/or minimize the inter-cell interference and further feedback overhead.

For the above-mentioned CoMP categories, the precoding vector is selected based on the following channel state information (CSI):

(1) Cross-correlation channel matrix between the UE's serving cell and neighbor cell; and
(2) Per-cell CSI including: auto-correlated channel matrix of the serving cell; auto-correlated channel matrix of the neighbor cell; UE-selected PMI/RI/CQI for the serving cell; and UE-selected PMI/RI/CQI for the neighbor cell.

As another embodiment of the present invention, such a scheme may be supported by UE feeding back at least the following information:

a) Long-term and/or wideband cross-correlation channel matrix between transmit channels of the serving cell and neighbor cell;
b) Long-term and/or wideband auto-correlation matrix of the serving cell;
c) Short-term and/or subband PMI/RI/CQI for the serving cell;
d) Short-term and/or subband PMI/RI/CQI for the neighbor cell.

As described later in detail, the auto-correlation matrix of the neighbor cell is also needed for choosing the precoding vector for CoMP. The simple way is to directly feed back the long-term and/or wideband auto-correlation matrix of neighbor cell. Although the feedback overhead for the correlated matrix can be efficiently reduced by long-term feedback duration and/or wideband average spectrum, it still results in additional feedback overhead compared with the per-cell feedback as proposed by NPL 5. In order to further reduce the feedback overhead, the auto-correlation matrix of the neighbor cell can be estimated by using the feedback auto-correlation matrix of serving cell and the cross-correlation channel matrix between transmit channels of the serving cell and neighbor cell.

By using the above-mentioned precoding vector selection and corresponding feedback scheme, the dynamic CoMP JT SU/MU-MIMO, which may include CoMP CB, can be realized with considering the inter-cell interference to improve the CoMP performance without substantially increasing feedback overhead.

FIG. 1 shows intra-/inter-eNB CoMP JT with SU-MIMO (or CoMP SU JT) transmission. In FIG. 1, a serving cell and a cooperating cell are denoted by reference signs A and B, respectively. It should be noted that the serving cell A and the cooperating cell B may be controlled by a single base station (eNB) or different eNBs. In the case of a single eNB controlling the serving cell and cooperating cell, it is referred to as intra-eNB CoMP JT with SU-MIMO transmission. In the case of different eNBs controlling the serving cell and cooperating cell, respectively, it is referred to as inter-eNB CoMP JT with SU-MIMO transmission and these eNBs can communicate with each other through an X2 interface. In this example, X2 interface is described, but other interface such as S1 interface can also be used for information exchange between eNBs. In this technical area, a point and a cell may have same meaning, so serving point, cooperating point and inter-point correlation can be interpreted as serving cell, cooperating cell and inter-cell correlation, respectively.

For CoMP JT with SU-MIMO transmission, data addressed to UE(i) is transmitted simultaneously from the serving cell A and the cooperating cell B. The precoding vector for UE(i) is decided based on the CSI fed back from UE(i). In this example, the CSI feedback includes cross-correlation channel matrix $R_i^{ab}$ between the serving cell A and the cooperating cell B in addition to auto-correlation channel matrix of the serving cell A, auto-correlated channel matrix of the cooperating cell B, UE-selected PMI/RI/CQI for the serving cell A, and UE-selected PMI/RI/CQI for the cooperating cell B.

More specifically, as shown in FIG. 1, the serving cell A and the cooperating cell B transmit pilot signals 100a and 100b and UE(i) receives them. Based on the received pilot signals, UE(i) estimates a transmit channel matrix $H_i^a$ from the serving cell A to UE(i) and a transmit channel matrix $H_i^b$ from the cooperating cell B to UE(i). Using these matrixes, $H_i^a$ and $H_i^b$, UE(i) calculates auto-correlation channel matrix $R_i^a = E\{(H_i^a)^H H_i^a\}$, auto-correlation channel matrix $R_i^b = E\{(H_i^b)^H H_i^b\}$, and cross-correlation channel matrix $R_i^{ab} = E\{(H_i^a)^H H_i^b\}$. The auto-correlation channel matrixes $R_i^a$ and $R_i^b$ only catch up the correlation properties of the channels between the serving cell A and UE(i) and between the serving cell B and UE(i) as described above. The cross-correlation channel matrix $R_i^{ab}$ represents the inter-cell correlation property between $H_i^a$ and $H_i^b$. According to the present embodiment, in addition to the auto-correlation channel matrixes $R_i^a$ and $R_i^b$, the cross-correlation channel matrix $R_i^{ab}$ is also sent back to the serving cell A. Joint precoding vector is selected using a joint correlation channel matrix $\hat{R}_i^{a+b}$ obtained from $R_i^a$, $R_i^b$, and $R_i^{ab}$, which will be described later. Accordingly, taking into account the inter-cell correlation property, the precoding vector selection for inter-cell coordination in DL CoMP can be made with minimizing inter-cell interference.

At UE(i), CQIs for the serving cell A and the cooperating cell B are measured based on pilot signals received from the serving cell A and the cooperating cell B, respectively. $PMI_i^a$ for the serving cell A is selected from a precoding vector codebook for the serving cell A using $H_i^a$ and $R_i^a$. $PMI_i^b$ for the cooperating cell B is selected from a precoding vector codebook for the serving cell B using $\hat{H}_i^{a+b}$ and $\hat{R}_i^{a+b}$, which will be described later, where $\hat{H}_i^{a+b}$ is a joint transmit channel matrix constructed by $H_i^a$ and $H_i^b$.

As described above, UE(i) feeds back the CSI, including the information about $\hat{R}_i^{a+b}$ (here, represented by $R_i^{ab}$, $R_i^a$, $R_i^b$) in long-term and/or wideband and the selected PMI/RI/CQI in short-term and/or subband, to the serving cell A.

Figure 2:
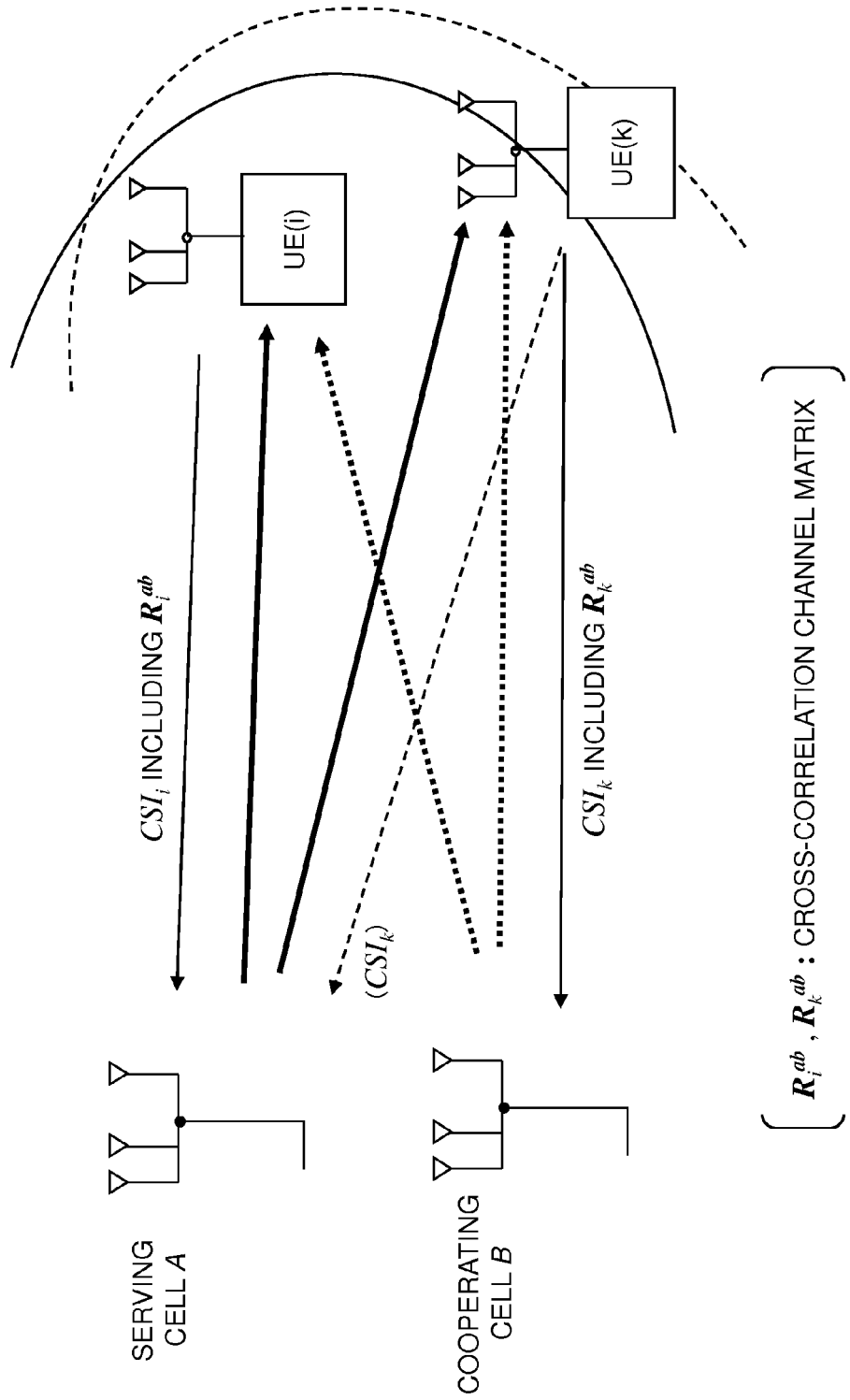
{FIG. 2}

FIG. 2 shows intra-/inter-eNB CoMP JT with MU-MIMO (or CoMP MU JT) transmission. In FIG. 2, a serving cell and a cooperating cell are denoted by reference signs A and B, respectively. It should be noted that the serving cell A and the cooperating cell B may be controlled by a single base station (eNB) or different eNBs. In the case of a single eNB controlling the serving and cooperating cells, it is referred to as intra-eNB CoMP JT with MU-MIMO transmission. In the case of different eNBs controlling the serving and cooperating cells, respectively, it is referred to as inter-eNB CoMP JT with MU-MIMO transmission and these eNBs can communicate with each other through an X2 interface.

For CoMP JT with MU-MIMO as shown in FIG. 2, UE(i) and UE(k) are regarded as a UE pair. Respective data addressed to the UE(i) and UE(k) are transmitted jointly from both the serving cell A and the cooperating cell B over the same allocated resource blocks no matter whether the UE(i) and UE(k) have the same serving cell or different serving cells. In the case of the UE(i) and UE(k) having the serving cell A as their serving cell, the UE(i) and UE(k) feed back their $CSI_i$ and $CSI_k$ to the serving cell A. In the case of the UE(i) and UE(k) having different serving cells A and B, respectively, the UE(i) feeds back its CSI, directly to the serving cell A and the UE(k) feeds back its $CSI_k$ directly to the serving cell B.

The channel estimation and feedback process for UE(i) is the same as that of the above-described CoMP JT with SU-MIMO. The same process for UE(i) is carried out at UE(k). Accordingly, the feedback CSIs from both UE(i) and UE(k) can be obtained for MU-MIMO precoding vector selection. The precoding vector for UE(i) and UE(k) can be jointly decided by using $\hat{R}_i^{a+b}$ and $\hat{R}_k^{a+b}$, which will be described later.

2. Radio communications system

Figure 3:
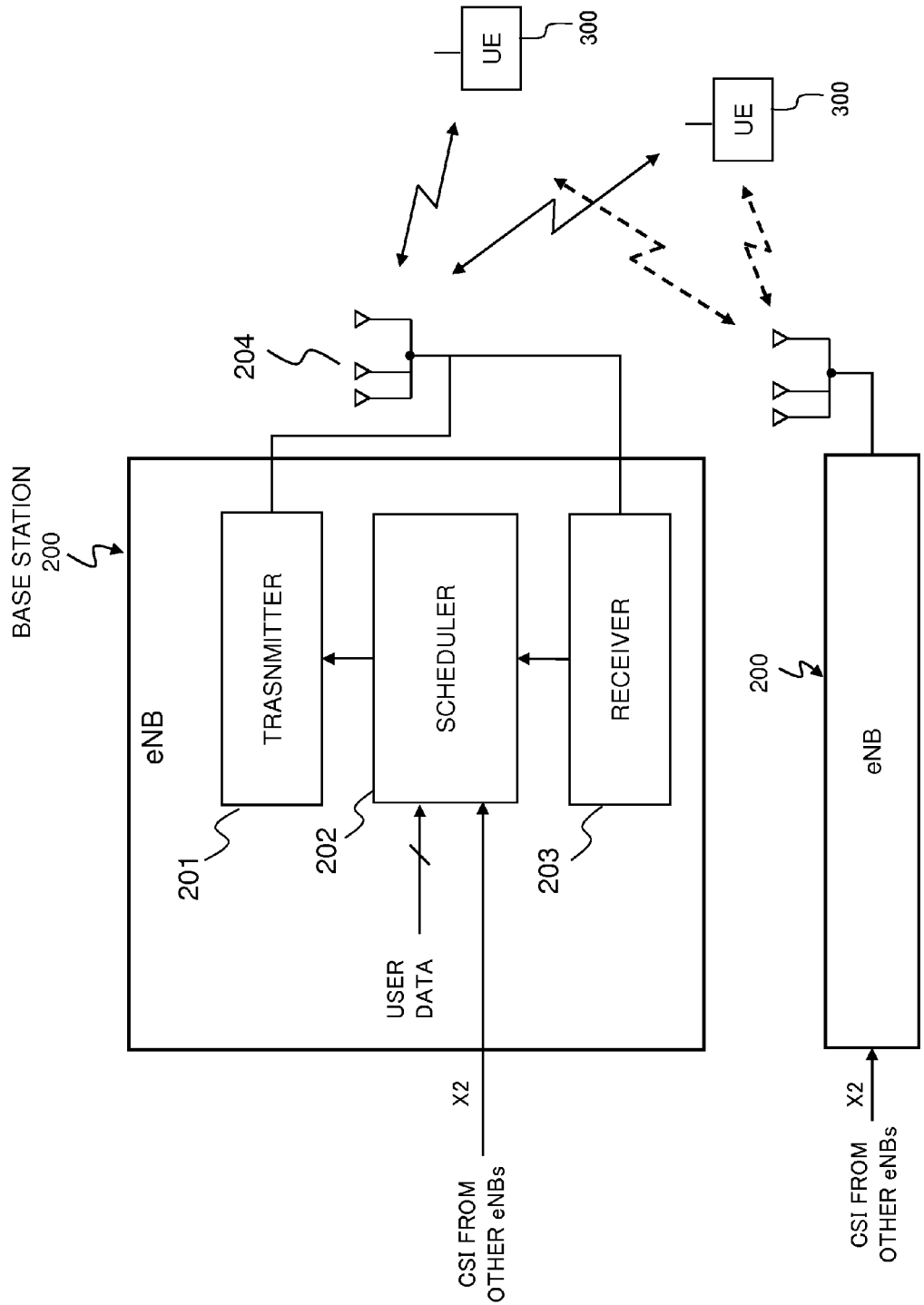
{FIG. 3}
Figure 6:
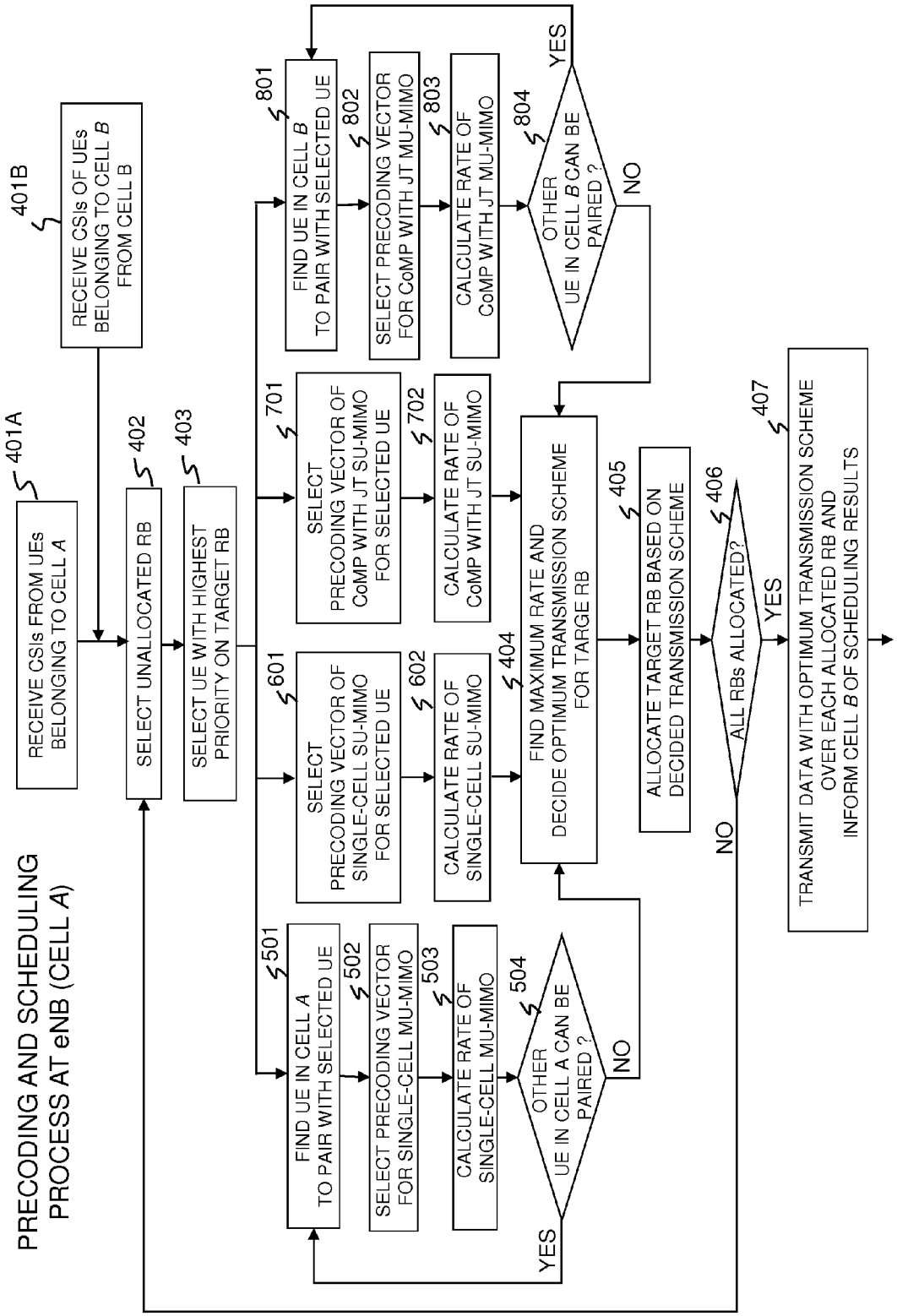
{FIG. 6}

As shown in FIG. 3, a base station (eNB) 200 according to the present embodiment is provided with a transmitter 201, a scheduler 202, a receiver 203 and an antenna set 204 which is connected to the transmitter 201 and the receiver 203. The transmitter 201 and the receiver 203 are used to communicate with each user equipment (UE) 300 through antenna 204. The transmitter 201 transmits pilot signals (or reference signals) as well as UEs' data and the receiver 203 receives CSI feedback from UEs. The scheduler 202 directly uses the feedback short-term PMI/RI together with the long-term feedback $\hat{R}_i^{a+b}$ to find the precoding vector ($\hat{W}^{a+b}_{i,SU}$ or [$\hat{W}^{a+b}_{i,MU} \hat{W}^{a+b}_{k,MU}$] as described later). The feedback CQIs from UEs belonging to its own cell and/or other cells are used for the channel-dependent scheduling at the scheduler 202. The transmitter 201, the scheduler 202 and the receiver 203 may be controlled by a program-controlled processor (not shown) such as CPU (central processing unit) executing programs stored in a memory (not shown). The scheduler 202 may be implemented on the program-controlled processor by running precoding vector selection and scheduling programs as shown in FIG. 6.

Figure 4:
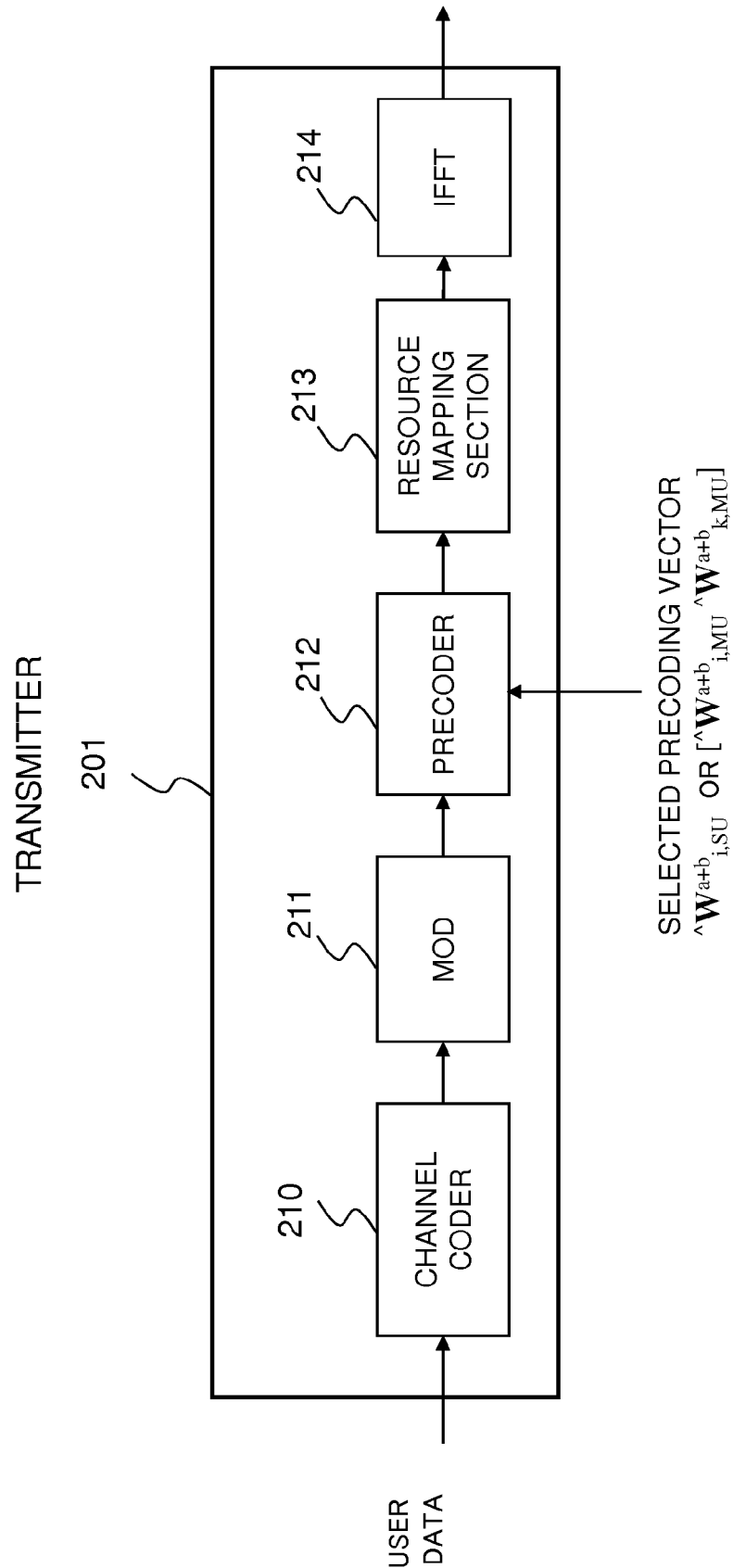
{FIG. 4}

As shown in FIG. 4, the transmitter 201 includes a channel coder 210, a modulator 211, a precoder 212, a resource mapping section 213 and IFFT (Inverse Fast Fourier Transform) 214. The precoder 212 performs precoding according to the selected precoding vector which is decided by the scheduler 202. The data of UE(i) is firstly coded at the channel coder 210, modulated at the modulator 211 and then precoded by using the selected precoding vector at the precoder 212. The precoded data of the UE(i) is mapped over allocated resource blocks at the resource mapping section 213 and then processed by the IFFT 214. Finally, the output of IFFT 214 is transmitted through the antenna set 204.

Figure 5:
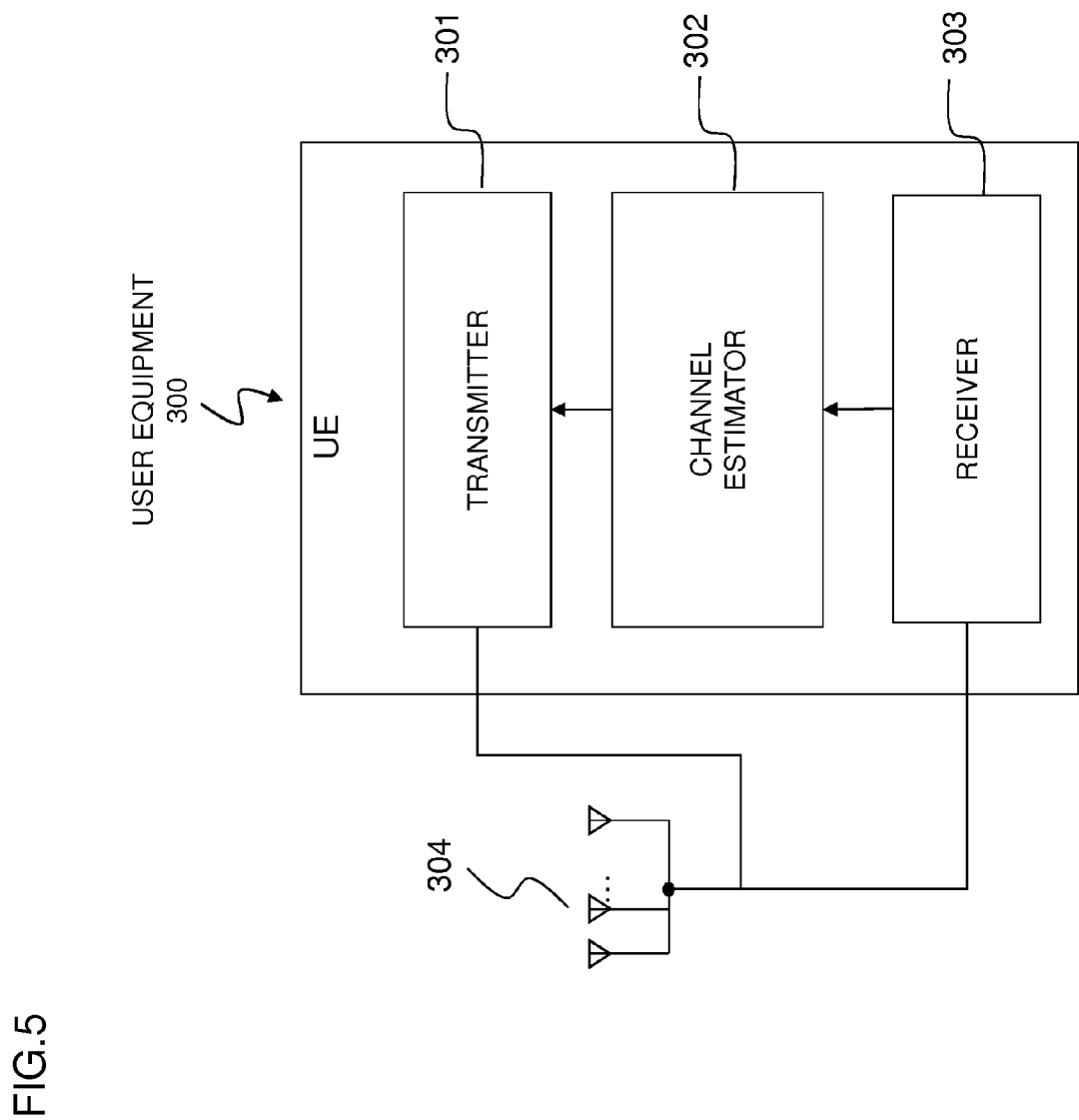
{FIG. 5}
Figure 7:
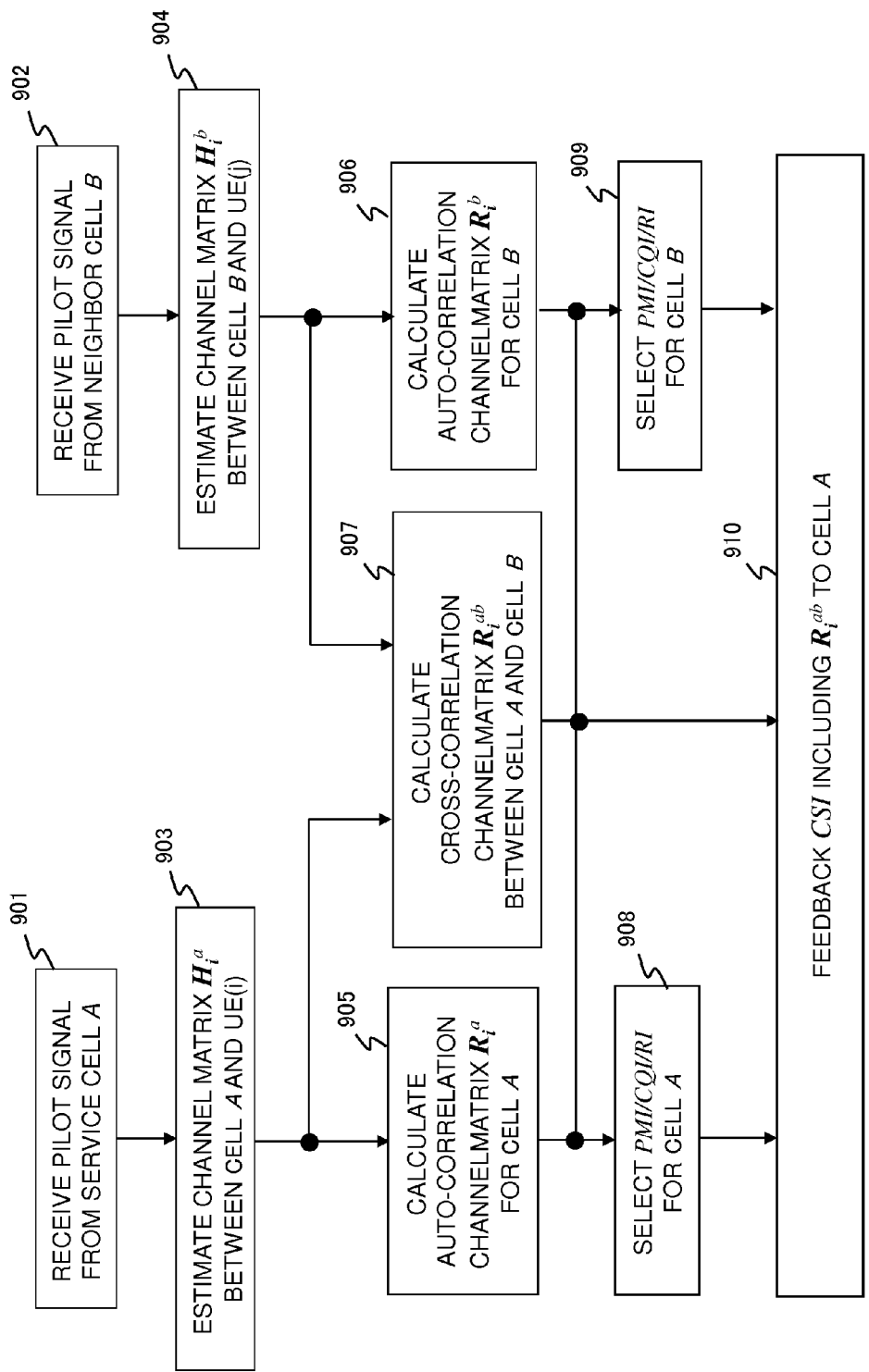
{FIG. 7}

As shown in FIG. 5, a user equipment (UE) 300 is provided with a transmitter 301, a channel estimator 302, a receiver 303 and an antenna set 304 which is connected to the transmitter 301 and the receiver 303. The receiver 303 receives the pilot signals as well as the data from the serving cell A and the neighbor cell B through the antenna set 304. The channel estimator 302 estimates the long-term/wideband correlation matrix and short-term/subband PMI/RI/CQI. The transmitter 301 feeds the estimated CSI back to the serving cell A through the antenna set 304. The transmitter 301, the channel estimator 302 and the receiver 303 may be controlled by a program-controlled processor (not shown) such as CPU (central processing unit) executing programs stored in a memory (not shown). The channel estimator 302 may be implemented on the program-controlled processor by running channel estimating programs as shown in FIG. 7. It should be noted that the UE 300 may be provided with the same function as the scheduler 202 of the eNB 200 and the eNB 200 may be provided with the same function as the channel estimator 302 of the UE 300.

3. Outline of precoding vector selection and scheduling process

For DL CoMP JT, it is required to share the data of UE(i) at both serving cell A and neighbor cell B; while for DL CoMP CB, the data is not shared but transmitted from the UE's serving cell only. The precoding vector selection and feedback method will be proposed to support intra-eNB and inter-eNB CoMP JT with SU-MIMO, CoMP JT with MU-MIMO, and CoMP CB, respectively. The intra-eNB and/or inter-eNB inter-cell interference can be minimized to achieve the maximum user throughput (data rate).

Hereafter, the precoding vector selection and scheduling operation in the base station (eNB) 200 according to the present embodiment will be described by referring to FIG. 6. Here, it is assumed that the scheduler 202 of the eNB 200 is a centralized scheduler and performs dynamic selection among single-cell SU-MIMO, single-cell MU-MIMO, CoMP JT with SU-MIMO and CoMP JT with MU-MIMO. CoMP CB is a simple example of CoMP JT with MU-MIMO. For the sake of convenience, it is further assumed that UE(i) and UE(j) belong to a cell A of the eNB 200, UE(k) belongs to a neighbor cell B and the UE(i) is the target UE. The scheduler 202 at the eNB controlling cell A is the centralized scheduler shown in FIG. 6. As described before, the cell A and the cell B may be controlled by the same base station (eNB) or different eNBs.

In FIG. 6, the eNB receiver 203 receives the feedback CSI from UEs belonging to its cell A (step 401A). For the UEs served by the cell B, the feedback CSI is received by the cell B and then transferred to the cell A (step 401B). In the case of the cell A and cell B having different eNBs, the feedback CSI received by the eNB of the cell B is transferred to the eNB of the cell A through an X2 backhaul.

Next, according to the received CQI of different UEs on different resource blocks (RBs), the scheduler 202 calculates the proportional fairness (PF) metric for resource allocation. Here, the PF criterion is used as an example, and other criteria, such as maximum CQI metric, QoS, etc., can also be used for resource allocation. The resource allocation is carried out RB-by-RB. The unallocated RB with highest PF metric is selected as a target RB (step 402). Over the target RB, the UE with the highest priority is chosen as the target UE (step 403) for the following process of dynamic selection among single-cell SU-MIMO, single-cell MU-MIMO, CoMP JT with SU-MIMO and CoMP JT with MU-MIMO. The scheduler 202 calculates the data rate for each of single-cell MU-MIMO, single-cell SU-MIMO, CoMP JT with SU-MIMO and CoMP JT with MU-MIMO (steps 501-504, steps 601-602, steps 701-702 and steps 801-804), which will be described later.

Comparing all the above calculated data rates, the scheduler 202 decides the optimal transmission scheme with the maximum data rate for the selected UE over the selected unallocated RB (regarded as target RB in step 404). After the dynamic transmission scheme selection, the target RB is allocated based on the optimal scheme (step 405). If there is any unallocated RB left (NO of step 406), the control of the scheduler 202 goes back to the step 402. In other words, the scheduling is not finished until all the RBs are allocated.

When all RBs have been allocated (YES of step 406), the transmitter 201 transmits the UEs' data over each RB with dynamically selected optimal scheme and the scheduler 202 informs the neighbor cell B of its scheduling results (step 407). More specifically, for CoMP JT and CoMP CB, the scheduler 202 at cell A needs to inform the scheduling results to the cooperating cell B. For CoMP JT with SU-MIMO or MU-MIMO, the cooperating cell B should synchronize with the serving cell A and simultaneously transmits the UE's data over the allocated RBs.

Since such a dynamic selection is based on not only long-term but also short-term feedback information and therefore, the optimum transmission scheme is updated as frequent as the short-term feedback period, e.g., 5 ms, 10 ms, etc.

Next, the data rate calculation (steps 501-504, steps 601-602, steps 701-702 and steps 801-804) will be described. For single-cell MU-MIMO, the scheduler 202 finds a UE in the cell A to pair with the selected UE (step 501). Thereafter, the scheduler 202 decides the precoding vector (step 502) and calculates the achievable data rate for the UE pair with single-cell MU-MIMO transmission (step 503). If any other UE in cell A can be paired with the selected UE (YES of step 504), the control of the scheduler 202 goes back to the step 501. If no other UE can be paired with the selected UE (NO of step 504), the control of the scheduler 202 goes to the step 404.

For single-cell SU-MIMO, the scheduler 202 decides the precoding vector (step 601) and calculates the achievable data rate for the single-cell SU-MIMO transmission (step 602). Thereafter, the control of the scheduler 202 goes to the step 404.

For CoMP JT with SU-MIMO, the feedback CSI of a UE belonging to the neighbor cell B is required. The scheduler 202 decides the precoding vector (step 701) and calculates the achievable rate for CoMP JT with SU-MIMO (step 702). Thereafter, the control of the scheduler 202 goes to the step 404.

For CoMP JT with MU-MIMO, the scheduler 202 finds a UE in the cell B to pair with the selected UE (step 801). Thereafter, the scheduler 202 decides the precoding vector (step 802) and calculates the achievable data rate for the CoMP JT with MU-MIMO transmission (step 803). If any other UE in cell B can be paired with the selected UE (YES of step 804), the control of the scheduler 202 goes back to the step 801. If no other UE can be paired with the selected UE (NO of step 804), the control of the scheduler 202 goes to the step 404. The data rate of CoMP CB can also be estimated in a similar way so that the scheduler 202 selects the precoding vector for the UE pair.

If the optimal transmission scheme is single-cell SU-MIMO transmission, the target RB at the serving cell A is allocated to the selected UE. In case of single-cell MU-MIMO transmission, the target RB is allocated to both the selected UE and the UE paired with the selected UE. In case of CoMP JT with SU-MIMO transmission, the selected UE has the target RB allocated at both the serving cell A and the neighbor cell B. As for CoMP JT with MU-MIMO, the UE paired with the selected UE also has the target RB allocated at cell A and cell B, simultaneously. If it is CoMP CB, only the target RB at the serving cell A is allocated to the selected UE; while only the target RB at the neighbor cell B is allocated to the paired UE.

4. Outline of CSI feedback process

Referring to FIG. 7, taking the UE(i) served by cell A as an example, the CSI feedback process at UE side will be described. The receiver 303 receives the pilot signal from the cell A as well as the pilot signal from the neighbor cell B through the antenna set 304 (steps 901 and 902).

The channel estimator 302 firstly estimates the channel matrix $H_i^a$ between the serving cell A and the UE(i) and $H_i^b$ between the neighbor cell B and the UE(i) (steps 903 and 904). By using $H_i^a$, the auto-correlation channel matrix of the serving cell A is calculated as $R_i^a = E\{(H_i^a)^H H_i^a\}$, which is averaged over the wideband and/or long-term period (step 905). In the same way, the auto-correlation channel matrix of the neighbor cell B is calculated as $R_i^b = E\{(H_i^b)^H H_i^b\}$ by using $H_i^b$ (step 906). Besides $R_i^a$ and $R_i^b$, the cross-correlation matrix between serving cell A and neighbor cell B is obtained as $R_i^{ab} = E\{(H_i^a)^H H_i^b\}$ (step 907).

Next, the channel estimator 302 uses the obtained $H_i^a$, $H_i^b$, $R_i^a$, $R_i^b$ and $R_a^{ab}$ to select PMI/RI/RI for cell A and cell B, respectively (steps 908, 909). With estimated $R_i^a$ and $H_i^a$, the short-term/subband PMI/RI can be decided assuming SU-MIMO transmission at serving cell A. On the other hand, by using $\{H_i^a, H_i^b\}$ and $\{R_i^a, R_i^b, R_i^{ab}\}$, the short-term PMI/RI for neighbor cell B can be decided assuming CoMP JT with SU-MIMO. The corresponding CQI over each subband (e.g., resource block) is estimated by the UE using the estimated channel matrices and decided precoding vectors.

Finally, the UE feeds back the CSI including the long-term/wideband correlation matrix and short-term/subband PMI/RI/CQI to the serving cell A from the transmitter 301 through the antenna set 304 (step 910).

5. Detailed operations 5.1) In case of single-cell SU-MIMO

Figure 8:
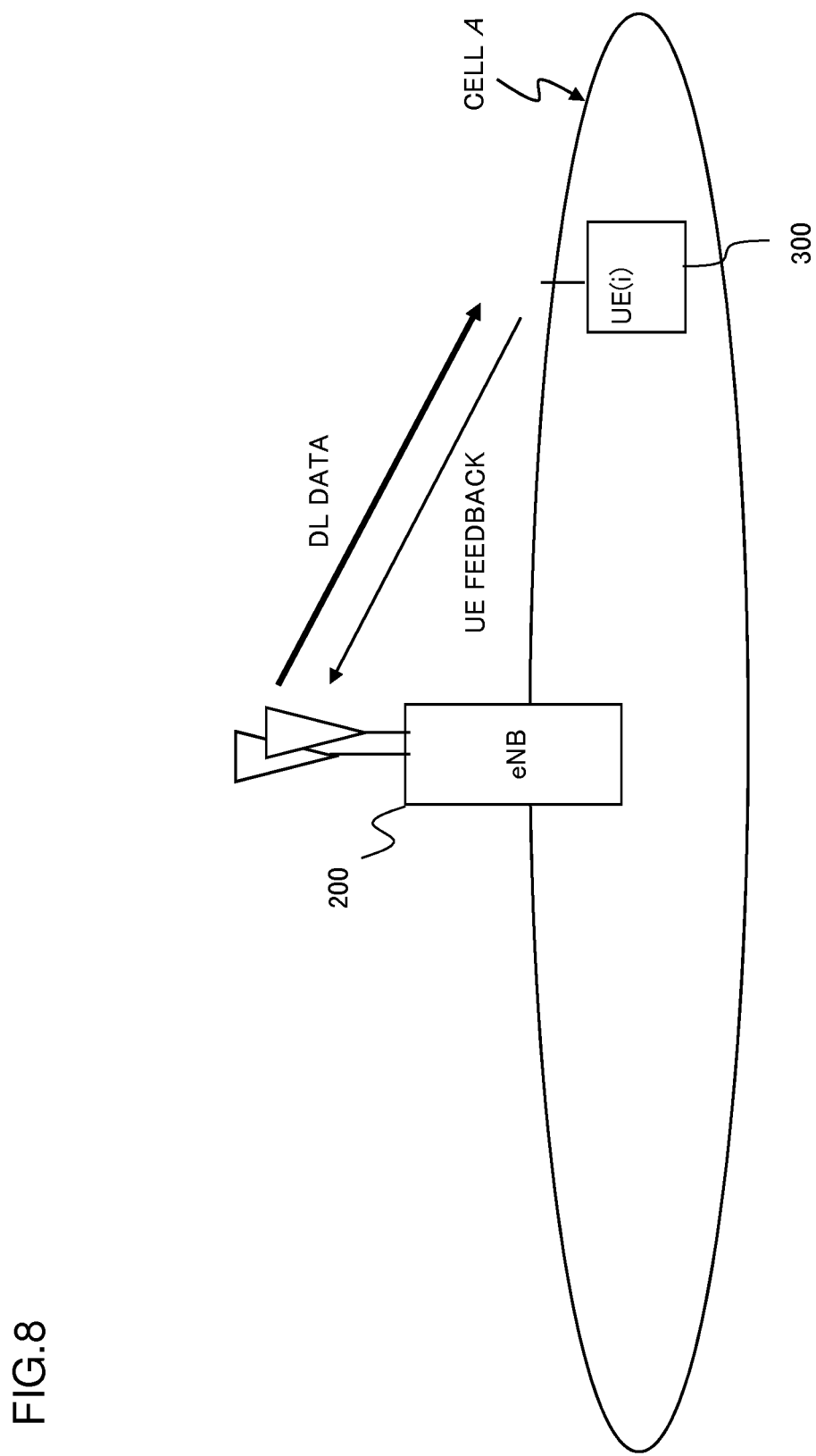
{FIG. 8}

FIG. 8 shows an example of single-cell SU-MIMO transmission, where a base station (eNB) 200 controls the cell A which is the serving cell of a UE 300 (hereafter, referred to as UE(i)). As described before, the transceiver structures of the eNB 200 and the UE 300 are exemplarily shown in FIGS. 3-5. In LTE Release 8/9, data to be transmitted to the UE(i) is only allocated to the serving cell A from higher layer and the serving cell A is transmitting the allocated data to the UE(i).

For the sake of convenience, let's assume UE(i) be the target UE. For single-cell SU-MIMO transmission in FIG. 8, the scheduler 202 of the eNB 200 selects the precoding vector based on the feedback long-term auto-correlation matrix $R_i^a$ of the target UE's serving cell A and the short-term PMI/RI as {Math. 1}

$$W_{i,SU}^a = (R_i^a)^{1/2} v_{PMI_i^a} \qquad (A1)$$

and calculates the corresponding data rate (see steps 601 and 602 in FIG. 6).

5.2) In case of single-cell MU-MIMO

Figure 9:
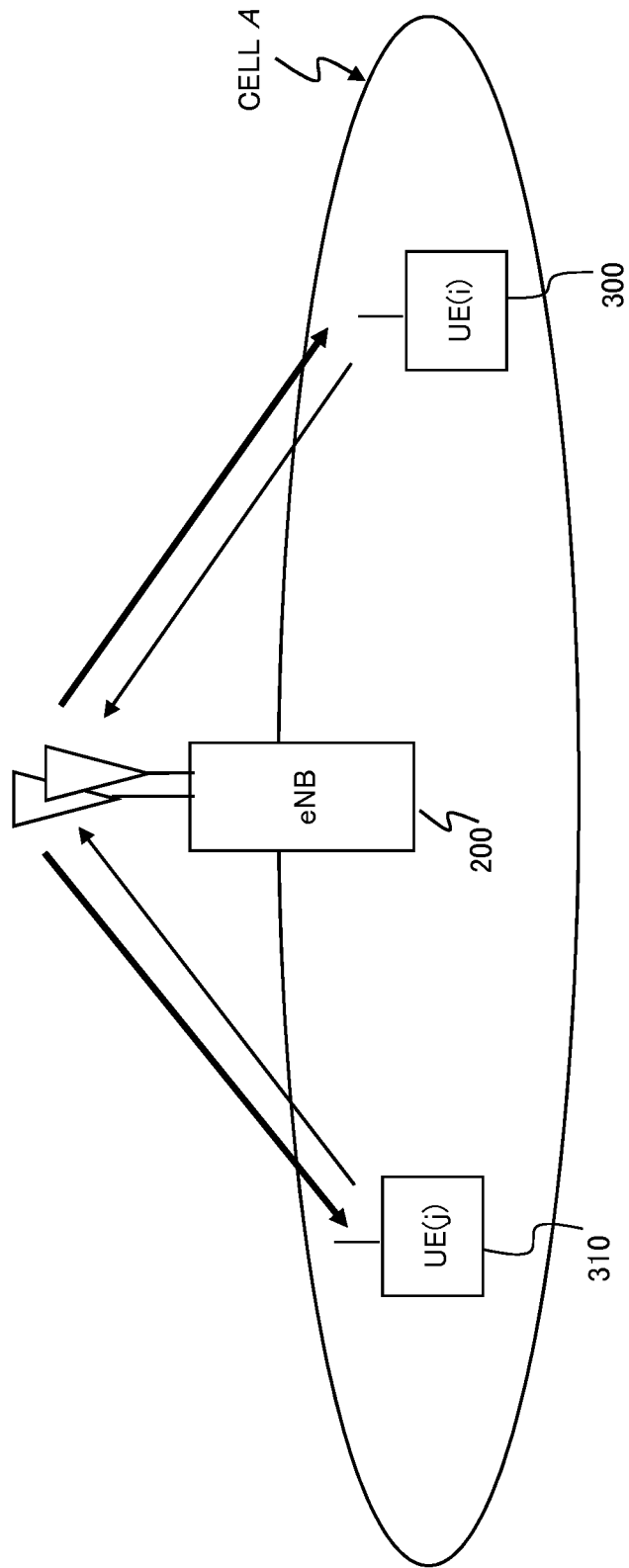
{FIG. 9}

FIG. 9 shows an example of single-cell MU-MIMO transmission, where UE 300 and UE 310 are both served by the cell A (hereafter, referred to as UE(i) and UE(j), respectively) and a pair of UE(i) and UE(j) is regarded as a UE pair for MU-MIMO transmission and the cell A is transmitting the data of UE(i) and UE(j) over the same allocated resource blocks. The intra-cell interference from the multiplexed UE can be minimized by using the antenna beam forming at the eNB transmitter 201.

For realizing single-cell transmission with MU-MIMO in FIG. 9, the scheduler 202 finds such a UE(j) to be paired with UE(i) and select the precoding vector as {Math. 2}

$$[W_{i,MU}^a \ W_{j,MU}^a] = \frac{(V_{i,j}^a)^H}{V_{i,j}^a (V_{i,j}^a)^H + \varepsilon I_{2N_{TX}^a}} \qquad (A2)$$

with

{Math. 3}

$$V_{i,j}^a = \begin{bmatrix} (R_i^a)^{1/2} \ v_{PMI_i^a}^1 \\ (R_j^a)^{1/2} \ v_{PMI_j^a}^1 \end{bmatrix} \qquad (A3)$$

where $N_{TX}^a$ is the number of antennas in the antenna set 204 of the cell A and e (epsilon) is the adjusting factor for zero forcing (ZF) to avoid noise enhancement. The rank per UE for MU-MIMO is assumed to be equal to 1 for sake of simplicity. The process for single-cell MU-MIMO transmission is finished when the best UE pair served by cell A is found to achieve the maximum rate (see steps 501-504 in FIG. 6).

5.3) In case of intra-eNB Comp JT with SU-MIMO

Figure 10:
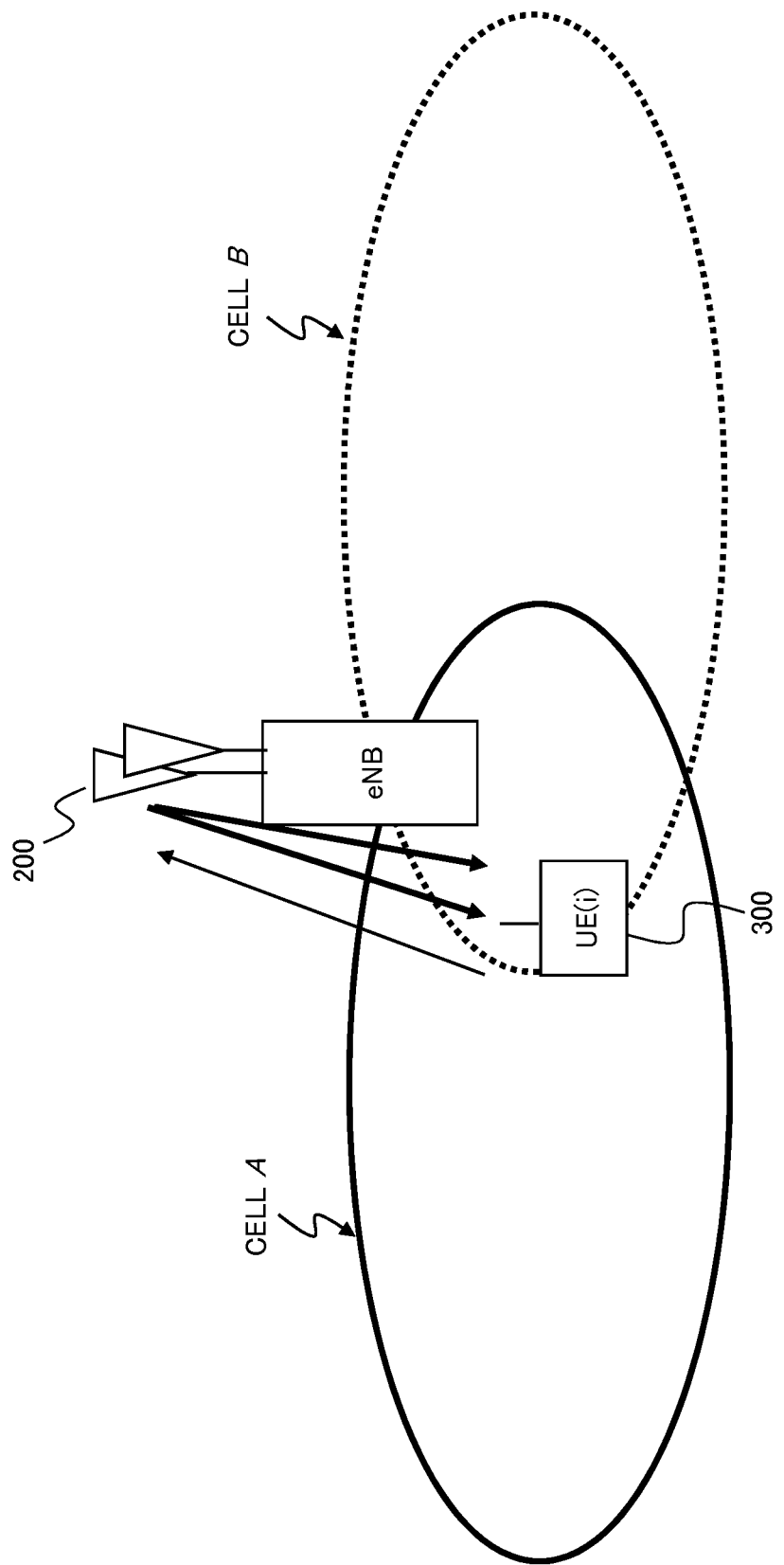
{FIG. 10}

Referring to FIG. 10, a serving cell A and a neighbor cell B belong to the same eNB 200. The serving cell A transmits pilot signals (or reference signals) from the transmitter 201 of the eNB 200 to UE(i) through the antenna set 204. When the receiver 303 of the UE(i) receives the pilot signals from the cell A, the channel estimator 302 estimates a transmit channel matrix from the cell A and UE(i), $H_i^a$, based on the received pilot signals. The same process is carried out to estimate a transmit channel matrix from a neighbor cell B to UE(i), $H_i^b$. For DL intra-eNB CoMP between cell A and the cell B, a joint transmit channel matrix $\hat{H}_i^{a+b}$ is constructed by using the transmit channel matrixes $H_i^a$ and $H_i^b$ as {Math.4}

$$\hat{H}_i^{a+b} = [H_i^a \sqrt{\alpha_i^{ab}} H_i^b] \quad (1)$$

where $\text{alpha}_i^{ab} = P_i^b/P_i^a$, and $P_i^a$ and $P_i^b$ are the average received signal power of the pilot signals (e.g., RSRP in LTE Release 8/9) received from the serving cell A and neighbor cell B, respectively. The left side of Eq. (1) is indicated by $\hat{H}_i^{a+b}$ as textual representation and the Greek character "alpha" in the right side of Eq. (1) is represented by alpha. Therefore, the auto-correlation joint channel matrix of $\hat{H}_i^{a+b}$ is defined as {Math.5}

$$\hat{R}_i^{a+b} = E\{(\hat{H}_i^{a+b})^H \hat{H}_i^{a+b}\} \quad (2)$$

By substituting Eq. (1) into (2), the auto-correlation joint channel matrix is obtained as {Math. 6}

$$\hat{R}_i^{a+b} = \begin{bmatrix} R_i^a & \sqrt{\alpha_i^{ab}} R_i^{ab} \\ (\sqrt{\alpha_i^{ab}} R_i^{ab})^H & \alpha_i^{ab} R_i^b \end{bmatrix}_{(N_{TX}^a + N_{TX}^b) \times (N_{TX}^a + N_{TX}^b)} \quad (3)$$

where $R_i^a = E\{(H_i^a)^H H_i^a\}$ is the auto-correlation channel matrix of $H_i^a$, $R_i^b = E\{(H_i^b)^H H_i^b\}$ is the auto-correlation channel matrix of $H_i^b$, and $R_i^{ab} = E\{(H_i^a)^H H_i^b\}$ is the cross-correlation channel matrix of $H_i^a$ and $H_i^b$. $N_{TX}^a$ and $N_{TX}^b$ are the number of antennas in the antenna set 204 of the cell A and cell B, respectively. Hereafter, the left side of Eq. (3) is indicated by $\hat{R}_i^{a+b}$ as textual representation. In the conventional scheme [NPL5], only $R_i^a$ and $R_i^b$ are fed back as the per-cell long-term feedback. However, $R_i^a$ and $R_i^b$ only catch up the correlation property of the channel between the cell A and the UE(i), $H_i^a$, and the correlation property of the channel between c cell B and the UE(i), $H_i^b$. The inter-cell correlation property between $H_i^a$ and $H_i^b$, represented by $R_i^{ab}$, is required to select the precoding vector to minimize the inter-cell interference and realize the inter-cell coordination in DL CoMP.

For intra-eNB CoMP JT with SU-MIMO, the data of UE(i) is transmitted simultaneously from the serving cell A and the cooperating cell B. The joint precoding vector for UE(i) is decided by using $\hat{R}_i^{a+b}$ as {Math.7}

$$\hat{W}_{i,SU}^{a+b} = [W_{i,SU}^a W_{i,SU}^b] = (\hat{R}_i^{a+b})^{1/2} [v_{PMI_i^a} v_{PMI_i^b}] \quad (4)$$

where $PMI_i^a$ is the PMI of recommended precoding vector selected from a precoding vector codebook (e.g. LTE Release 8 codebook) for cell A, and $PMI_i^b$ is the PMI of recommended precoding vector selected from a precoding vector code book for cell B (see step 701 in FIG. 6). Firstly, $PMI_i^a$ and the rank for transmission of cell A are selected to achieve the maximum user throughput as {Math. 8}

$$\{RI_{i,SU}^a, PMI_{i,SU}^a\} = \underset{RI,PMI}{\operatorname{argmax}} \sum_{r=1}^{RI} \text{RATE} \left\{ \frac{P_i^a \|H_i^a (R_i^a)^{1/2} v_{PMI}^r\|^2}{\sum_{\substack{a' \neq a \\ a' \neq b}} P_i^{a'} (H_i^a (R_i^a)^{1/2} v_{PMI}^r)^H H_i^{a'} v_i^{a'} + N} \right\} \quad (5)$$

where N is the power of AWGN (Additive White Gaussian Noise) noise. With knowing $\{RI_{i,SU}^a, PMI_{i,SU}^a\}$, $PMI_i^b$ and the rank for CoMP JT transmission are selected to achieve the maximum user throughput as {Math. 9}

$$\{RI_{i,SU}^{a+b}, PMI_{i,SU}^b\} = \underset{RI,PMI}{\operatorname{argmax}} \sum_{r=1}^{RI} \text{RATE} \left\{ \frac{P_i^a \left\|\hat{H}_i^{a+b} (\hat{R}_i^{a+b})^{1/2} \left[v_{PMI_i^a}^{\text{mod}(r,RI_{i,SU}^a)} v_{PMI}^r\right]\right\|^2}{\sum_{\substack{a' \neq a \\ a' \neq b}} P_i^{a'} \left(\hat{H}_i^{a+b} (\hat{R}_i^{a+b})^{1/2} \left[v_{PMI_i^a}^{\text{mod}(r,RI_{i,SU}^a)} v_{PMI}^r\right]\right)^H H_i^{a'} v_i^{a'} + N} \right\} \quad (6)$$

Also, CQI is calculated at the channel estimator 302 of UE(i). After that, the transmitter 301 of UE(i) feeds back the CSI, including the information about $\hat{R}_i^{a+b}$ (the method to feedback the information about $R_i^{ab}$ will be described later) in long-term and the selected PMI/RI/CQI in short-term to the cell A through the UE antenna set 304. The receiver 203 of the eNB 200 receives the feedback CSI through the antenna set 204 and the scheduler 202 inputs the received feedback CSI for the following process. The scheduler 202 directly uses the feedback short-term PMI/RI in Eqs. (5) and (6) together with the long-term feedback $\hat{R}_i^{a+b}$ to find the precoding vector as Eq. (4). The feedback CQI is used for the channel-dependent scheduling at the scheduler 202. As shown in FIG. 4, the data to be transmitted to UE(i) is firstly coded at the channel coder 210, modulated by the modulator 211 and then precoded by using $\hat{W}_{i,SU}^{a+b}$ in Eq. (4) by the precoder 212. The precoded data for the UE(i) is mapped over allocated resource blocks by the resource mapping section 213 and then processed by the IFFT 214. Finally, the output of IFFT 214 is transmitted through the antenna set 204.

5.4) In case of inter-eNB Comp JT with SU-MIMO

Figure 11:
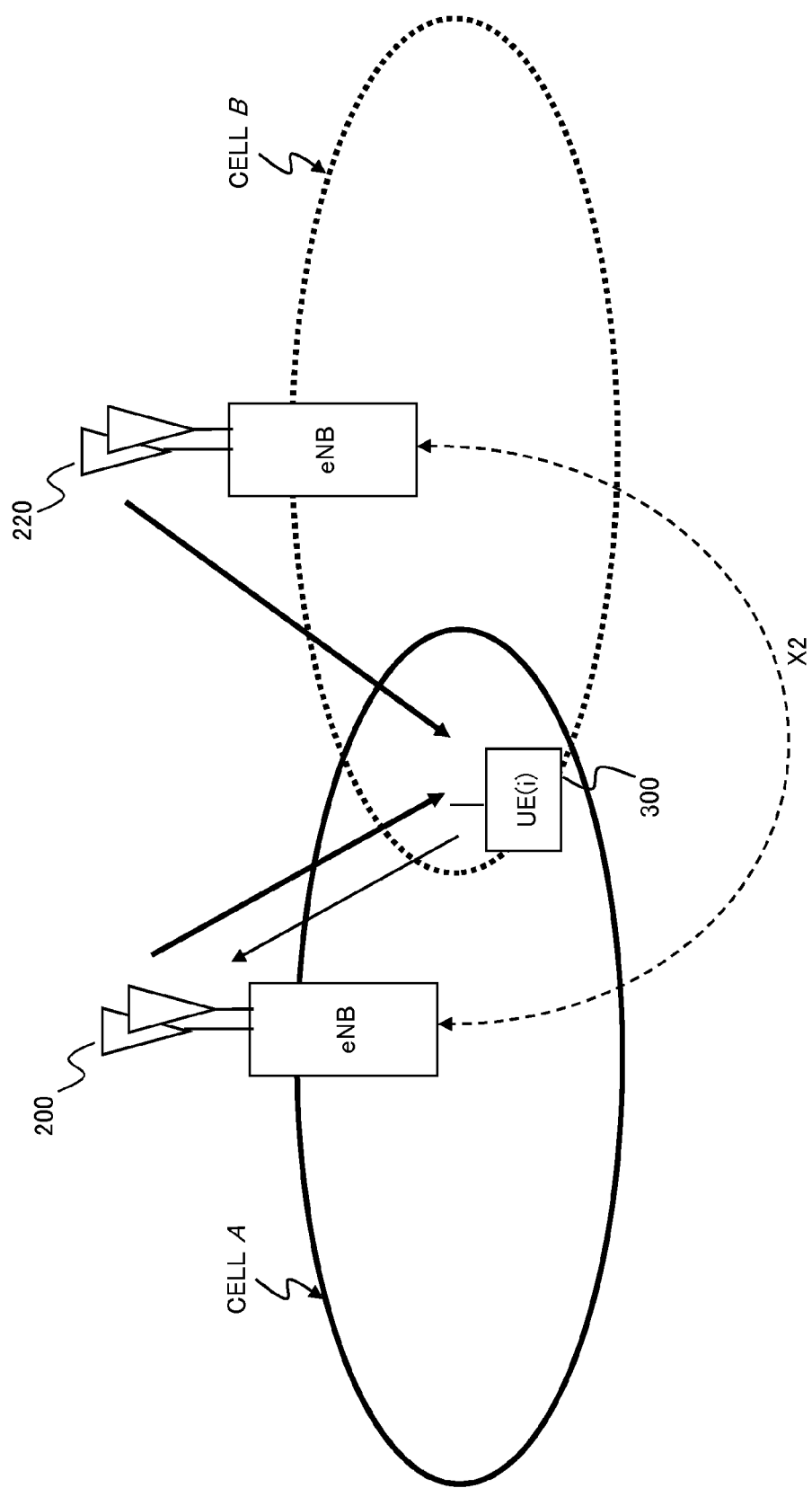
{FIG. 11}

Referring to FIG. 11, for inter-eNB CoMP JT with SU-MIMO, a serving cell A and a neighbor cell B belong to different eNBs 200 and 220 which are connected to each other through an X2 backhaul link. Assuming that the scheduler 202 at the eNB 200 of the serving cell A is a centralized scheduler, the UE(i) feeds back the CSIs for the cell A and cell B directly to the cell A as the input of scheduler 202 at the eNB 200. The precoding vector selection process is carried out in the same way as that of intra-eNB CoMP JT with SU-MIMO as described above. After scheduling, inter-eNB information and scheduling results (including precoding vector, allocated resource blocks, selection RI, Modulation and Coding Scheme (MCS), etc.) have to be exchanged between the eNB 200 of cell A and the eNB 220 of cell B for inter-eNB CoMP through the X2 backhaul link. In other words, the inter-eNB CoMP is only different from intra-eNB CoMP in terms of the information exchange between the cells through the X2 backhaul link between two different eNBs.

5.5) In case of intra-eNB CoMP JT with MU-MIMO

Figure 12:
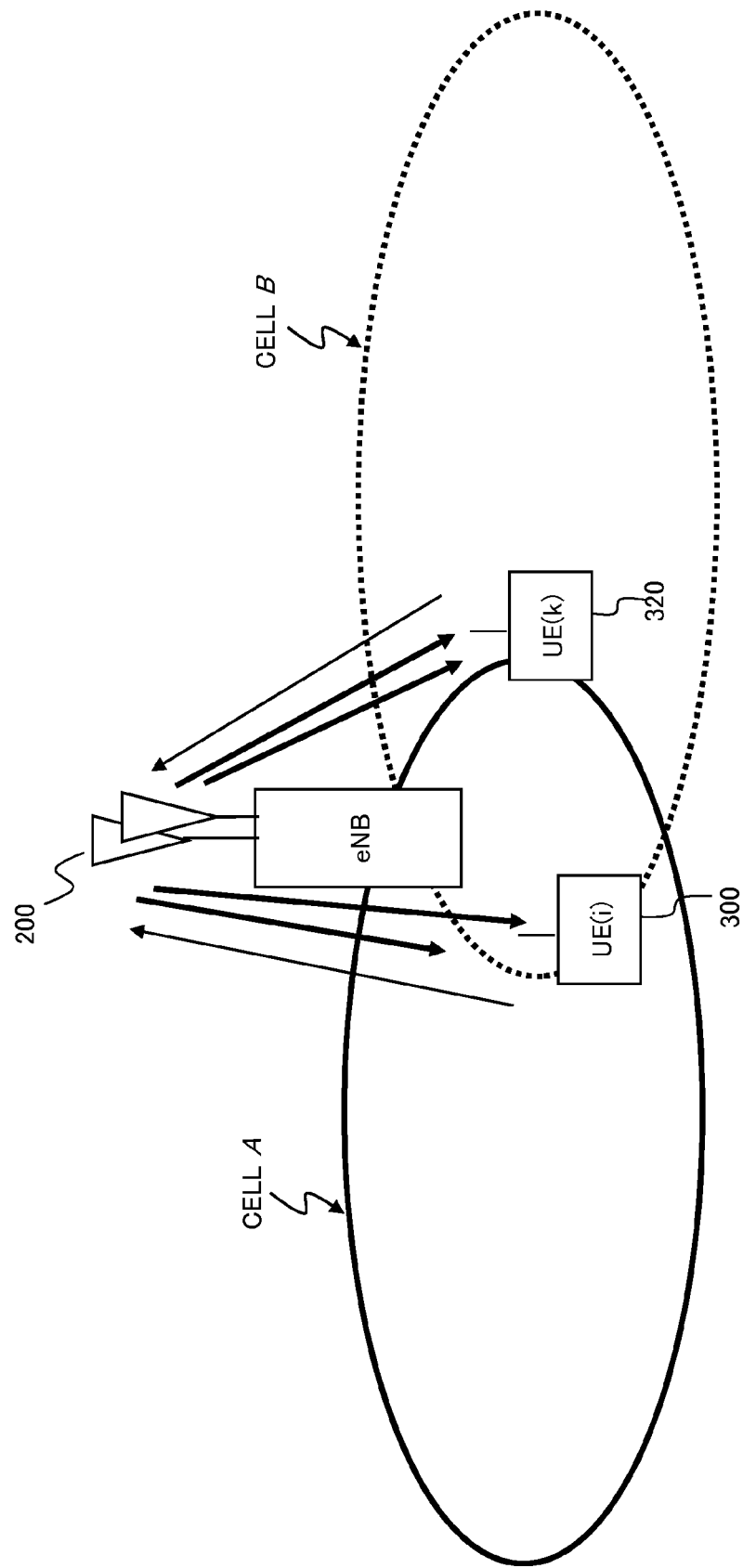
{FIG. 12}

Referring to FIG. 12, for intra-eNB CoMP JT with MU-MIMO, a pair of UE 300 and UE320 is regarded as a UE pair for CoMP JT with MU-MIMO, which will be referred to as UE(i) and UE(k), respectively. The data for UE(i) and UE(k) is transmitted jointly from both the cell A and cell B over the same allocated resource blocks, although the UE(i) and UE(k) may have different serving cell. The channel estimation and feedback process for UE(i) is same as that described in intra-eNB CoMP JT with SU-MIMO. The same process for UE(i) is carried out at UE(k). At the same eNB of the cell A and cell B, the feedback CSI from both UE(i) and UE(k) can be obtained for MU-MIMO precoding vector selection. The precoding vector for UE(i) and UE(k) is jointly decided by using $\hat{R}_i^{a+b}$ and $\hat{R}_k^{a+b}$ as {Math. 10}

$$[\hat{W}_{i,MU}^{a+b} \quad \hat{W}_{k,MU}^{a+b}] = \frac{(\hat{V}_{i,k}^{a+b})^H}{\hat{V}_{i,k}^{a+b}(\hat{V}_{i,k}^{a+b})^H + \varepsilon I_{2(N_{TX}^a + N_{TX}^b)}} \quad (7)$$

with

{Math. 11}

$$\hat{V}_{i,k}^{a+b} = \begin{bmatrix} (\hat{R}_i^{a+b})^{1/2} \hat{v}_{PMI_i}^1{}^{a+b} \\ (\hat{R}_k^{a+b})^{1/2} \hat{v}_{PMI_k}^1{}^{a+b} \end{bmatrix}, \quad (8)$$

where the rank per UE for MU-MIMO is assumed to be equal to 1 for sake of simplicity. If the precoding vectors selected by UE(i) and UE(k) are orthogonal to each other, i.e., $$\hat{v}_{PMI_i}^1{}^{a+b}(\hat{v}_{PMI_k}^1{}^{a+b})^H = 0 \quad \{Math.12\}$$

with $$\hat{v}_{PMI_i}^1{}^{a+b} = [v_{PMI_i}^1{}^a v_{PMI_i}^1{}^b], \hat{v}_{PMI_k}^1{}^{a+b} = v_{PMI_k}^1{}^a v_{PMI_k}^1{}^b], \quad \{Math.13\}$$

the followings are obtained:

{Math. 14}

$$\hat{V}_{i,k}^{a+b} \hat{V}_{i,k}^{a+bH} = \begin{bmatrix} \hat{R}_i^{a+b} & 0 \\ 0 & \hat{R}_k^{a+b} \end{bmatrix} \quad (9)$$

and then

{Math. 15}

$$[\hat{W}_{i,MU}^{a+b} \quad \hat{W}_{k,MU}^{a+b}] = [W_{i,MU}^a \quad W_{i,MU}^b \quad W_{k,MU}^a \quad W_{k,MU}^b] \quad (10)$$

$$= \begin{bmatrix} W_{i,SU}^a \\ W_{i,SU}^b \\ W_{k,SU}^a \\ W_{k,SU}^b \end{bmatrix}^H \left( \begin{bmatrix} \hat{R}_i^{a+b} & 0 \\ 0 & \hat{R}_k^{a+b} \end{bmatrix} + \varepsilon I_{2(N_{TX}^a + N_{TX}^b)} \right)^{-1}$$

5.6) In case of inter-eNB CoMP JT with MU-MIMO

Figure 13:
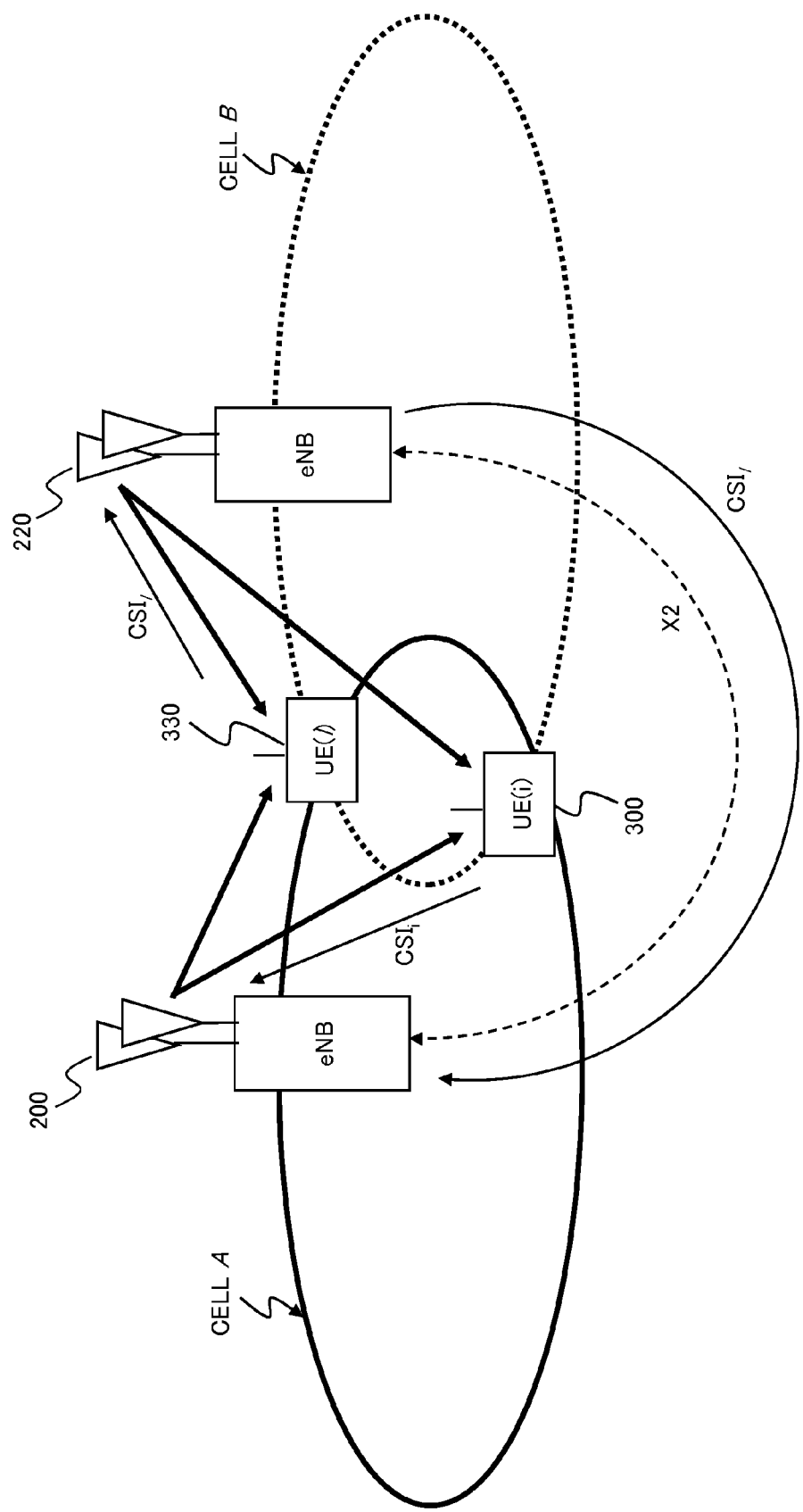
{FIG. 13}

Referring to FIG. 13, for inter-eNB CoMP JT with MU-MIMO, a serving cell A and a neighbor cell B belong to different eNBs 200 and 220 which are connected to each other through an X2 backhaul link. UE 300 and UE 330 are served by cell A and cell B, which will be referred to as UE(i) and UE(l), respectively. Assuming that the scheduler 202 at the eNB 200 of the serving cell A is a centralized scheduler, the UE(i) feeds back CSI, for the cell A and cell B directly to the eNB 200 while the UE(l) feeds back CSI, for the cell A and cell B directly to the eNB 220 at its serving cell B. The feedback CSI, of UE(l) is transferred from the eNB 220 to the eNB 200 through the X2 backhaul link. The precoding vector selection process is carried out in the same way as that of intra-eNB CoMP JT with MU-MIMO as described above. After scheduling, inter-eNB information and scheduling results (including precoding vector, allocated resource blocks, selection RI, Modulation and Coding Scheme (MCS), etc.) have to be exchanged between the eNB 200 of cell A and the eNB 220 of cell B for inter-eNB CoMP through the X2 backhaul link. In other words, the inter-eNB CoMP is only different from intra-eNB CoMP in terms of the information exchange between the cells through the X2 backhaul link between two different eNBs.

5.7) In case of intra-eNB CoMP CB

Figure 14:
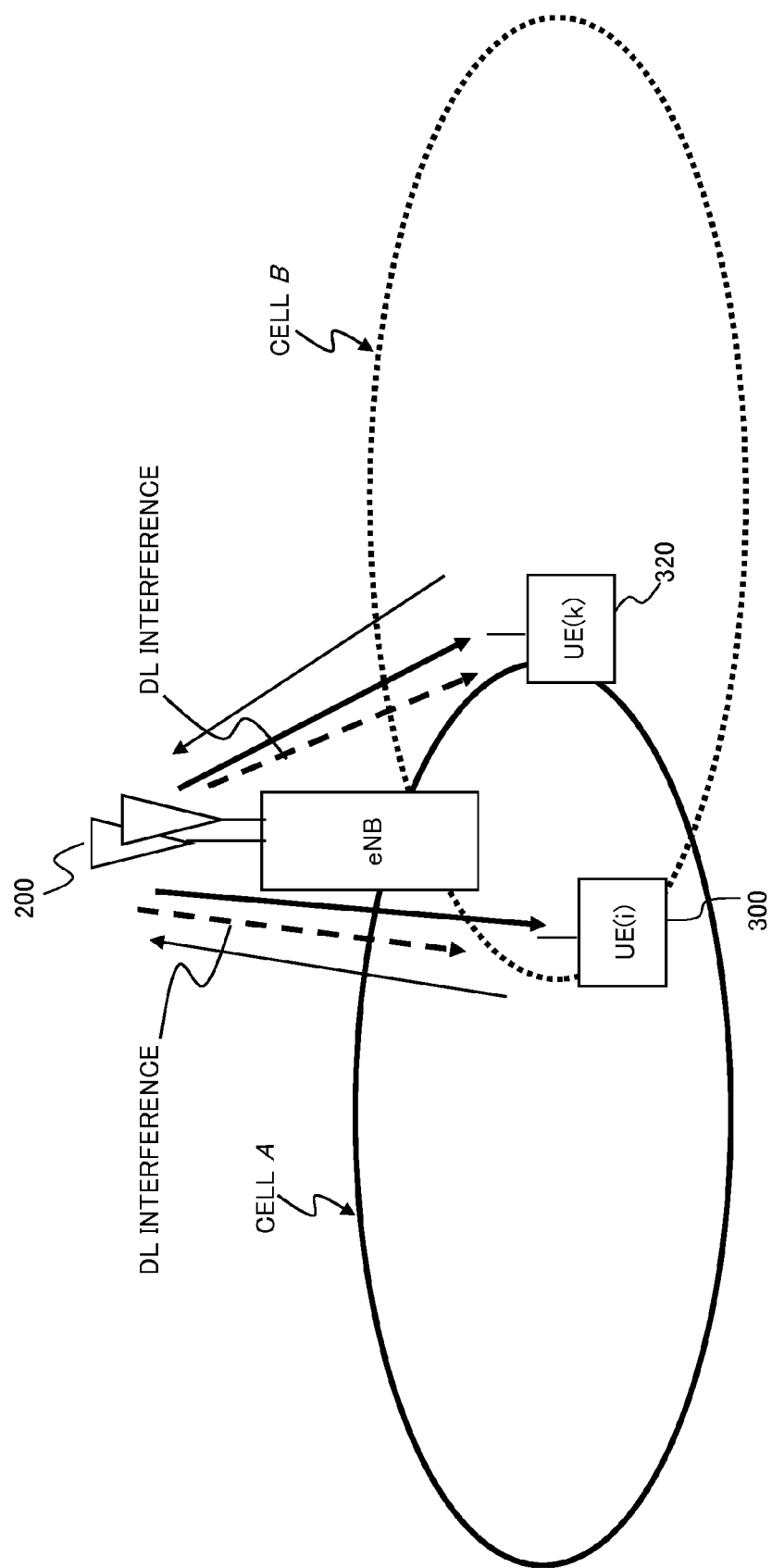
{FIG. 14}

Referring to FIG. 14, for intra-eNB CoMP CB, a pair of UE 300 and UE 320 is regarded as a UE pair for CoMP JT with MU-MIMO, which will be referred to as UE(i) and UE(k), respectively. Different from FIG. 12, the data for UE(i) is transmitted from its serving cell A only and the data for UE(k) is transmitted from the serving cell B only. Therefore, CoMP CB as shown in FIG. 14 is a special case of CoMP JT with MU-MIMO in FIG. 12, where the transmit power from the cell B to the UE(i) as well as the transmit power from the cell A to the UE(k) are switched off. The precoding vector for UE(i) and UE(k) can be decided by also using $\hat{R}_i^{a+b}$ and $\hat{R}_k^{a+b}$ as {Math. 16}

$$[\hat{W}_{i,MU}^{a+b} \quad \hat{W}_{k,MU}^{a+b}] = [W_{i,MU}^a \quad 0 \quad 0 \quad W_{k,MU}^a] \quad (11)$$

$$= \begin{bmatrix} W_{i,SU}^a \\ 0 \\ 0 \\ W_{k,SU}^b \end{bmatrix}^H \left( \begin{bmatrix} \hat{R}_i^{a+b} & 0 \\ 0 & \hat{R}_k^{a+b} \end{bmatrix} + \varepsilon I_{2(N_{TX}^a + N_{TX}^b)} \right)^{-1}$$

on the condition that $$\hat{v}_{PMI_i}^{a+b}(\hat{v}_{PMI_i}^{a+b})^H = 1, \hat{v}_{PMI_k}^{a+b}(\hat{v}_{PMI_k}^{a+b})^H = 1, \hat{v}_{PMI_i}^{a+b}(\hat{v}_{PMI_k}^{a+b})^H = 0 \quad \{Math.17\}$$

where $$\hat{v}_{PMI_i}^{a+b} = [v_{PMI_i}^a 0] \text{ and } \hat{v}_{PMI_k}^{a+b} = [0 v_{PMI_k}^b]. \quad \{Math.18\}$$

5.8) In case of inter-eNB CoMP CB

Figure 15:
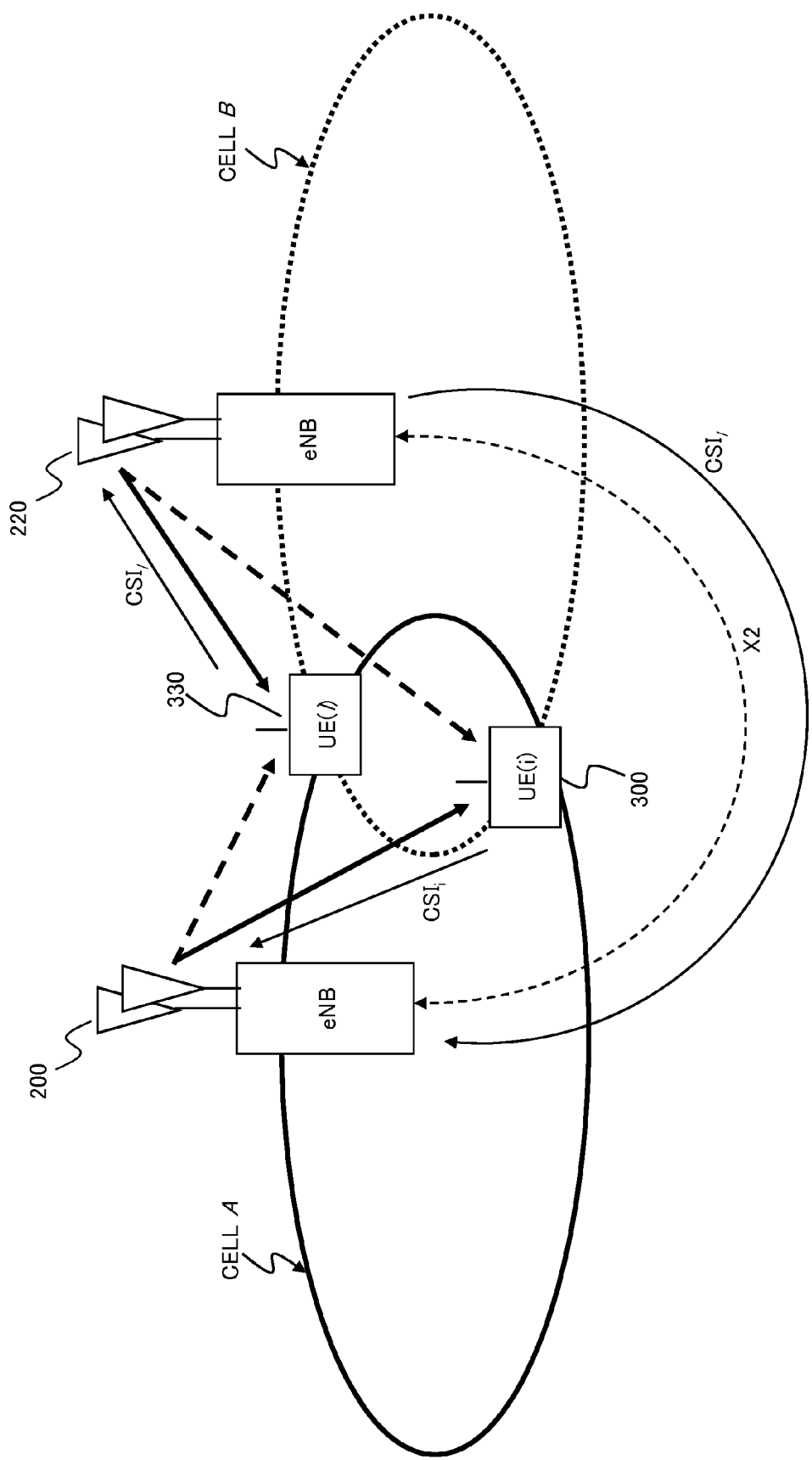
{FIG. 15}

Referring to FIG. 15, for inter-eNB CoMP CB, a serving cell A and a neighbor cell B belong to different eNBs 200 and 220 which are connected to each other through an X2 backhaul link. UE 300 and UE 330 are served by cell A and cell B, which will be referred to as UE(i) and UE(l), respectively. Assuming that the scheduler 202 at the eNB 200 of the serving cell A is a centralized scheduler, the UE(i) feeds back CSI, for the cell A and cell B directly to the eNB 200 while the UE(l) feeds back CSI, for the cell A and cell B directly to the eNB 220 at its serving cell B. The feedback CSI, of UE(l) is transferred from the eNB 220 to the eNB 200 through the X2 backhaul link. The precoding vector selection process is carried out in the same way as that of intra-eNB CoMP CB as described above. After scheduling, inter-eNB information and scheduling results (including precoding vector, allocated resource blocks, selection RI, Modulation and Coding Scheme (MCS), etc.) have to be exchanged between the eNB 200 of cell A and the eNB 220 of cell B for inter-eNB CoMP through the X2 backhaul link. In other words, the inter-eNB CoMP is only different from intra-eNB CoMP in terms of the information exchange between the cells through the X2 backhaul link between two different eNBs.

5.9) Further reduction in feedback overhead

In order to realize the above precoding vector selection, $\hat{R}_i^{a+b}$ is needed to be measured and fed back from the UE(i). Instead of directly feeding back quantized $\hat{R}_i^{a+b}$, the components of $\hat{R}_i^{a+b}$, such as $R_i^a$, $R_i^b$ and $R_i^{ab}$, can be quantized and fed back to reduce the feedback overhead.

According to the per-cell feedback in the conventional scheme [NPL5], long-term $R_i^a$ and short-term PMI/RI/CQI are fed back as the CSI for the cell A; while long-term $R_i^b$ and short-term PMI/RI/CQI are fed back as the CSI for the cell B. However, the cross-correlation channel matrix $R_a^{ab}$ is not known at the eNB in the conventional scheme [NPL5]. In order to minimize the inter-cell interference and realize the inter-cell coordination in DL CoMP, $R_i^{ab}$ need to be fed back as an additional CSI to indicate the inter-cell correlation property. A simple way is to directly quantize and feed back $R_i^{ab}$ in addition to the per-cell feedback. However, it results in larger feedback overhead than that of the conventional scheme [NPL5].

In order to further reduce the feedback overhead while still achieve the good performance of above dynamic CoMP JT SU/MU-MIMO and/or CoMP CB, only $R_i^a$ and $R_a^{ab}$ are fed back as the long-term feedback from UE(i). $R_i^b$ is not fed back but estimated by using $R_i^a$ and $R_i^{ab}$ as {Math. 19}

$$R_i^b \approx R_i'^b = \beta_i^a (R_i^{ab})^H R_i^{ab} \quad (12)$$

with

{Math. 20}

$$\beta_i^a = \left(\frac{1}{N_{RX}} \text{trace}(R_i^a)\right)^{-1}.$$

Here, since the UE antenna set 304 with $N_{RX}$ antennas have much lower antenna height than eNB antenna set 204, the channel seen at different UE's receive antennas are uncorrelated due to the rich reflection and refraction. Accordingly, the following approximation can be used to derive Eq. (12):

{Math. 21}

$$\because E\{H_i^a (H_i^a)^H\} \approx \left(\frac{1}{N_{RX}} \sum_{m=1}^{N_{RX}} \sum_{n=1}^{N_{TX}} |h_i^a(m,n)|^2\right) I_{N_{TX}^a \times N_{TX}^a} \quad (13)$$

$$= \left(\frac{1}{N_{RX}} \text{trace}(R_i^a)\right) I_{N_{TX}^a \times N_{TX}^a}$$

$$\begin{cases} E\left\{\sum_{n=1}^{N_{TX}} h_i^a(1,n) h_i^a(2,n)^*\right\} \approx 0 \\ E\left\{\sum_{n=1}^{N_{TX}} |h_i^a(1,n)|^2\right\} \approx E\left\{\sum_{i=1}^{N_{TX}} |h_i^a(2,i)|^2\right\} \approx \frac{1}{N_{RX}} \text{trace}(R_i^a) \end{cases}$$

$$\therefore (R_i^{ab})^H R_i^b = E\{(H_i^b)^H H_i^a (H_i^a)^H H_i^b\}$$

$$\approx \left(\frac{1}{N_{RX}} \text{trace}(R_i^a)\right) E\{(H_i^b)^H H_i^b\}$$

$$= (\beta_i^a)$$

By using the feedback $R_i^a$, $R_i^{ab}$ and the estimated $R_i'^b$ in Eq. (12), $\hat{R}_i^{a+b}$ can be approximated as {Math. 22}

$$\hat{R}_i^{a+b} \approx \begin{bmatrix} R_i^a & \sqrt{\alpha_i^{ab}} R_i^{ab} \\ \left(\sqrt{\alpha_i^{ab}} R_i^{ab}\right)^H & \alpha_i^{ab} R_i'^b \end{bmatrix} \quad (14)$$

Therefore, at the scheduler 202, the intra-eNB dynamic CoMP JT with SU/MU-MIMO and/or CoMP CB can be realized by using Eqs. (4)-(11).

6. Other exemplary embodiments 6.1) In the cases described above, pilot signals (or reference signals) are used for calculating inter-cell correlation or auto-correlation matrix. However, the present invention is not limited to these cases. Inter-cell correlation or auto-correlation matrix can be also calculated by using channels which carry control information or data. An example of a channel which carries control information is Physical Downlink Control Channel (PDCCH) and an example of a channel which carries data is Physical Downlink Shared Channel (PDSCH). By using these channels, the precoding vector can be selected not only at the beginning of data transmission but also during data transmission.

6.2) In the above-described exemplary embodiments, the precoding vector is determined by using inter-cell correlation property $R_a^{ab}$ and auto-correlation properties $R_i^a$ and $R_i^b$. However, the present invention is not limited to these exemplary embodiments. It is possible to adjust the previously selected precoding vector by using inter-cell correlation property only. More specifically, once the candidate of the precoding vector is selected at previous data transmission, the precoding vector can be adjusted by using only inter-cell correlation property. In this case, UE feeds back the CSI including the information only $R_1^{ab}$ and eNB selects precoding vector by using it. CSI including the information such as $R_1^{ab}$ is fed back in long-term (e.g., 50 ms, 100 ms or 1 s) and auto-correlation properties $R_i^a$ and $R_i^b$ do not substantially change in a few terms. Accordingly, the precoding vector can be adjusted by using only inter-cell correlation property.

6.3) The UE feedback in support of enhanced multiuser MIMO transmission includes two matrices (Wk, k=1, 2). W1 is a long-term/wideband precoding matrix, which is to indicate the auto-correlation of the channel matrix from the serving cell to the UE. W2 is a short-term/subband precoding matrix, which is to indicate the frequency-selective property of the channel from the serving cell to the UE. A precoder W for a subband is obtained as a matrix multiplication of W1 and W2 (a kronecker structure is a special case).

The three main categories of CoMP feedback mechanisms have been identified to be:

Explicit channel state/statistical information feedback
  Channel as observed by the receiver, without assuming any transmission or receiver processing
Implicit channel state/statistical information feedback
  feedback mechanisms that use hypotheses of different transmission and/or reception processing, e.g., CQI/PMI/RI
UE transmission of SRS can be used for CSI estimation at eNB exploiting channel reciprocity.
Combinations of full or subset of above three are possible.

Look at these types of feedback mechanisms for the evaluations. UL overhead (number of bits) associated with each specific feedback mechanism needs to be identified. The feedback overhead (UL) vs, DL performance tradeoff should be assessed with the goal to target minimum overhead for a given performance.

For the CoMP schemes that require feedback, individual per-cell feedback is considered as baseline. Besides individual per-cell feedback for CoMP based on feedback frame structure for single-cell enhanced multiuser MIMO transmission, inter-cell feedback is also needed. The inter-cell feedback is a wideband long-term feedback to indicate the inter-cell correlation between the channel from the serving cell to UE and the channel from cooperating cell to the UE. With the inter-cell feedback, the wideband long-term precoding matrix for the cooperating cell, which is to indicate the auto-correlation property of the channel matrix from the cooperating cell to the UE, may need not to be fed back for further reducing the feedback overhead.

UE CoMP feedback reports target the serving cell (on UL resources from serving cell) as baseline when X2 interface is available and is adequate for CoMP operation in terms of latency and capacity. In this case, the reception of UE reports at cells other than the serving cell is a network implementation choice.

The feedback reporting for cases with X2 interface not available or not adequate (latency and capacity), and for cases where feedback reports to the serving cell causes large interference (e.g., in heteronegenous deployment scenarios) for CoMP operation needs to be discussed and, if found needed, a solution needs to be identified.

INDUSTRIAL APPLICABILITY

The present invention can be applied to a mobile communications system employing precoding vector selection and feedback for DL CoMP.

| {Reference Signs List} | |
|---|---|
| 100a, 100b | DL data transmission |
| 200, 220 | base station (eNB) |
| 201 | transmitter |
| 202 | scheduler |
| 203 | receiver |
| 204 | antenna set |
| 210 | channel coder |
| 211 | modulator |
| 212 | precoder |
| 213 | resource mapping section |
| 214 | IFFT |
| 300, 301, 320, 330 | user equipment (UE) |
| 301 | transmitter |
| 302 | channel estimator |
| 303 | receiver |
| 304 | antenna set |

The invention claimed is:

1. A method for deciding a precoding vector of coordinated multi-point transmission (CoMP) for at least one user equipment in a network, comprising:
receiving channel state information for CoMP from the user equipment, wherein the channel state information includes inter-cell correlation property between a serving cell serving the user equipment and a cooperating cell for CoMP,
wherein the inter-cell correlation property is represented by a cross-correlation channel matrix which is obtained by correlation between a first transmit channel matrix from the serving cell to the ,equipment and a second transmit channel matrix from the cooperating cell to the user equipment, and wherein a precoding matrix index (PMI) for the serving cell and the cooperating cell is selected by the user equipment with a joint channel matrix and a joint correlation matrix, wherein the joint channel matrix is constructed b the first transmit channel a matrix from the serving cell to the user equipment and the second transmit channel matrix from the cooperating cell to the user equipment; and the joint correlation matrix is constructed by the cross-correlation channel matrix, the first auto-correlation channel of the serving cell and the second auto-correlation channel matrix of the cooperating cell; and
deciding the precoding vector of CoMP based on the channel state information.

2. The method according to claim 1, wherein the channel state information further includes first auto-correlation channel property between the serving cell and the user equipment.

3. The method according to claim 2, wherein the network estimates second auto-correlation channel property between the cooperating cell and the user equipment by using the first auto-correlation channel property and the inter-cell correlation property.

4. The method according to claim 2, wherein the channel state information further includes second auto-correlation channel property between the cooperating cell and the user equipment.

5. The method according to claim 1, wherein the user equipment feeds back PMI information and channel matrix information whose term is longer than the PMI information, wherein the channel matrix information includes at least the cross-correlation channel matrix and the auto-correlation channel of the serving cell, wherein the PMI information includes the PMI for the serving cell and the PMI for the cooperating cell.

6. The method according to claim 1, wherein the user equipment feeds back PMI information and channel matrix information whose bandwidth is wider than the PMI information, wherein the channel matrix information includes at least the cross-correlation channel matrix and the auto-correlation channel of the serving cell, wherein the PMI information includes the PMI for the serving cell and the PMI for the cooperating cell.

7. A system for deciding a precoding vector of coordinated multipoint transmission (CoMP) for at least one user equipment in a network, comprising:
a receiver for receiving channel state information for CoMP from the user equipment, wherein the channel state information includes inter-cell correlation property between a serving cell serving the user equipment and a cooperating cell for CoMP,
wherein the inter-cell correlation property is represented by a cross-correlation channel matrix which is obtained by correlation between a first transmit channel matrix from the serving cell to the user equipment and a second transmit channel matrix from the cooperating cell to the user equipment, and
wherein a precoding matrix index (PMI) for the serving cell and the cooperating cell is selected by the user equipment with a joint channel matrix and a joint correlation matrix, wherein the joint channel matrix is constructed by the first transmit channel matrix from the serving cell to the user equipment and the second transmit channel matrix from the cooperating cell to the user equipment; and the joint correlation matrix is constructed by the cross-correlation channel matrix, the first auto-correlation channel of the serving cell and the second auto-correlation channel matrix of the cooperating cell; and a scheduler for deciding the precoding vector of CoMP based on the channel state information.

8. The system according to claim 6, wherein the channel state information further includes first auto-correlation channel property between the serving cell and the user equipment.

9. The system according to claim 7, wherein the scheduler estimates second auto-correlation channel property between the cooperating cell and the user equipment by using the first auto-correlation channel property and the inter-cell correlation property.

10. The system according to claim 7, wherein the channel state information further includes second auto-correlation channel property between the cooperating cell and the user equipment.

11. A base station in a cellular network, comprising the system according to claim 6.

12. A user equipment in a cellular network, comprising:
a channel estimator for generating channel state information for CoMP, wherein the channel state information includes inter-cell correlation property between a serving cell serving the user equipment and a cooperating cell for CoMP,
wherein the channel state information further includes second auto-correlation channel property between the cooperating cell and the user equipment, and
wherein a precoding matrix index (PMI) for the serving cell and the cooperating cell is selected by using a joint channel and a joint correlation matrix, wherein the joint channel matrix is constructed by the first transmit channel matrix from the serving cell to the user equipment and the second transmit channel matrix from the cooperating cell to the user equipment; and the joint correlation matrix is constructed by the cross-correlation channel matrix, the first auto-correlation channel of the serving cell and the second auto-correlation channel matrix of the cooperating cell; and
a transmitter for transmitting the channel state information to the serving cell.

13. The user equipment according to claim 11, wherein the channel state information further includes first auto-correlation channel property between the serving cell and the user equipment.

14. The user equipment according to claim 11, wherein the inter-cell correlation property is represented by a cross-correlation channel matrix which is obtained by correlation between a first transmit channel matrix from the serving cell to the user equipment and a second transmit channel matrix from the cooperating cell to the user equipment.

15. The user equipment according to claim 12, wherein the user equipment feeds back PMI information and channel matrix information whose term is longer than the PMI information, wherein the channel matrix information includes at least the cross-correlation channel matrix and the auto-correlation channel of the serving cell, wherein the PMI information includes the PMI for the serving cell and the PMI for the cooperating cell.

16. The user equipment according to claim 12, wherein the user equipment feeds back PMI information and channel matrix information whose bandwidth is wider than the PMI information, wherein the channel matrix information includes at least the cross-correlation channel matrix and the auto-correlation channel of the serving cell, wherein the PMI information includes the PMI for the serving cell and the PMI for the cooperating cell.

17. A feedback method in a user equipment in a cellular network, comprising:
generating channel state information for CoMP, wherein the channel state information includes inter-cell correlation property between a serving cell serving the user equipment and a cooperating cell for CoMP,
wherein the channel state information further includes second auto-correlation channel property between the cooperating cell and the user equipment, and
wherein a precoding matrix index (PMI) for the serving cell and the cooperating cell is selected by using a joint channel matrix and a joint correlation matrix, wherein the joint channel matrix s constructed by the first transmit channel matrix from the serving cell to the user equipment and the second transmit channel matrix from the cooperating cell to the user equipment; and the joint correlation matrix is constructed by the cross-correlation channel matrix, the first auto-correlation chat el of the serving cell and the second auto-correlation channel matrix of the cooperating cell; and
transmitting the channel state information to the serving cell.

18. A computer-readable program stored in a recording medium, for functioning a program-controlled processor as a system deciding a precoding vector of coordinated multipoint transmission (CoMP) for at least one user equipment in a network, comprising:
receiving channel state information for CoMP from the user equipment, wherein the channel state information includes inter-cell correlation property between a serving cell serving the user equipment and a cooperating cell for CoMP,
wherein the inter-cell correlation property is represented by a cross-correlation channel matrix which is obtained by correlation between a first transmit channel matrix from the serving cell to the user equipment and a second transmit channel matrix from the cooperating cell to the user equipment, and
wherein a precoding matrix index (PMI) for the serving cell and the cooperating cell is selected by the user equipment with a joint channel matrix and a joint correlation matrix, wherein the joint channel matrix is constructed by the first transmit channel matrix from the serving cell to the user equipment and the second transmit channel matrix from the cooperating cell to the user equipment; and the joint correlation matrix is constructed by the cross-correlation channel matrix, the first auto-correlation channel of the serving cell and the second auto-correlation channel matrix of the cooperating cell; and
deciding the precoding vector of CoMP based on the channel state information.

19. A computer-readable program stored in a recording medium, for functioning a program-controlled processor as a user equipment for transmitting channel state information for CoMP to a network, comprising:
generating the channel state information including inter-cell correlation property between a serving cell serving the user equipment and a cooperating cell for CoMP,
wherein the channel state information further includes second auto-correlation channel property between the cooperating cell and the user equipment, and
wherein a precoding matrix index (PMD) for the serving cell and the cooperating cell is selected by using a joint channel matrix and a joint, correlation matrix, wherein the joint channel matrix is constructed by the first transmit channel matrix from the serving cell to the user equipment and the second transmit channel matrix from the cooperating cell to the user equipment; and the joint correlation a is constructed by the cross-correlation channel matrix, the first auto-correlation channel of the serving cell and the second auto-co elation channel matrix of the cooperating cell; and transmitting the channel state information to the serving cell.

* * * * *